(12) United States Patent
Hirano et al.

(10) Patent No.: US 10,361,840 B2
(45) Date of Patent: Jul. 23, 2019

(54) SERVER APPARATUS, SEARCH SYSTEM, TERMINAL APPARATUS, SEARCH METHOD, NON-TRANSITORY COMPUTER READABLE MEDIUM STORING SERVER PROGRAM, AND NON-TRANSITORY COMPUTER READABLE MEDIUM STORING TERMINAL PROGRAM

(71) Applicant: MITSUBISHI ELECTRIC CORPORATION, Tokyo (JP)

(72) Inventors: Takato Hirano, Tokyo (JP); Yutaka Kawai, Tokyo (JP); Mitsuhiro Hattori, Tokyo (JP); Takashi Ito, Tokyo (JP); Nori Matsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 207 days.

(21) Appl. No.: 15/509,169

(22) PCT Filed: Oct. 21, 2014

(86) PCT No.: PCT/JP2014/077941
§ 371 (c)(1),
(2) Date: Mar. 6, 2017

(87) PCT Pub. No.: WO2016/063344
PCT Pub. Date: Apr. 28, 2016

(65) Prior Publication Data
US 2017/0288858 A1    Oct. 5, 2017

(51) Int. Cl.
*H04L 9/06* (2006.01)
*G06F 16/22* (2019.01)
*G06F 21/62* (2013.01)
*G06F 21/60* (2013.01)

(52) U.S. Cl.
CPC ........ *H04L 9/0618* (2013.01); *G06F 16/2255* (2019.01); *G06F 21/602* (2013.01); *G06F 21/6218* (2013.01); *H04L 9/0643* (2013.01)

(58) Field of Classification Search
CPC ... H04L 9/0618; H04L 9/0643; G06F 21/602; G06F 17/3033; G06F 21/6218; G06F 16/2255
See application file for complete search history.

(56) References Cited

U.S. PATENT DOCUMENTS 8,429,421 B2 * 4/2013 Chase ................. G06F 21/6227
380/277
2010/0153403 A1 * 6/2010 Chang ............... G06F 17/30616
707/747

(Continued)

FOREIGN PATENT DOCUMENTS

| JP | 5-81102 A | 4/1993 |
| JP | 2013-152520 A | 8/2013 |
| JP | 2013-161154 A | 8/2013 |

OTHER PUBLICATIONS

Song et al., Practical Techniques for Searches on Encrypted Data, 12 pages (Year: 2000).*

(Continued)

*Primary Examiner* — Ali S Abyaneh
*Assistant Examiner* — Huan V Doan
(74) *Attorney, Agent, or Firm* — Birch, Stewart, Kolasch & Birch, LLP

(57) ABSTRACT

In a server apparatus, a data storage part stores a plurality of pieces of encrypted data. An index storage part stores, as an index I, a data structure which is for performing search with using a function H that outputs a unique numeric value in response to an inputted keyword, the data structure having a plurality of storage areas corresponding, in one-to-one relation, to numeric values outputted from the function H, (Continued)

and storing, for a plurality of keywords corresponding to plaintext data, an identifier of encrypted data being post-encryption data of the plaintext data to which each keyword corresponds, in a storage area corresponding to the numeric value outputted from the function H when each keyword is inputted. A search part inputs one of the plurality of keywords to the function H, identifies a storage area corresponding to the numeric value outputted from the function H, from the index I, and acquires encrypted data corresponding to the identifier stored in the identified storage area, from the data storage part.

16 Claims, 15 Drawing Sheets

(56) References Cited

U.S. PATENT DOCUMENTS

| | | | |
|---|---|---|---|
| 2013/0046974 A1* | 2/2013 | Kamara | H04L 9/00 713/165 |
| 2014/0331044 A1* | 11/2014 | Fujii | H04L 9/3239 713/165 |
| 2015/0143112 A1* | 5/2015 | Yavuz | G06F 17/3033 713/165 |
| 2017/0262546 A1* | 9/2017 | Chen | G06F 21/602 |

OTHER PUBLICATIONS

Bellare et al., "Deterministic and Efficiently Searchable Encryption", CRYPTO 2007, Lecture Notes in Computer Science, vol. 4622, pp. 535-552.

Boneh et al., "Public Key Encryption with keyword Search", EUROCRYPT 2004, Lecture Notes in Computer Science 3027, Springer, 2004.

Curtmola et al., "Searchable Symmetric Encryption: Improved Definitions and Efficient Constructions", ACM CCS 2006, pp. 1-26.

Hirano et al., "Relationships among Security Notions for SSE after Adding Encrypted Indexes", SCIS 2014, pp. 1-8.

Kurosawa et al., "UC-Secure Searchable Symmetric Encryption", FC 2012, Lecture Notes in Computer Science 7397, Springer, 2012.

* cited by examiner

Fig. 2

| KEYWORD | DATA NAME |
|---|---|
| PATENT | DATA 1, DATA 3, DATA 5 |
| PERSONNEL INFORMATION | DATA 2, DATA 3, DATA 7, DATA 10 |
| BUDGET | DATA 1, DATA 2 |
| ... | ... |

SERVER APPARATUS, SEARCH SYSTEM, TERMINAL APPARATUS, SEARCH METHOD, NON-TRANSITORY COMPUTER READABLE MEDIUM STORING SERVER PROGRAM, AND NON-TRANSITORY COMPUTER READABLE MEDIUM STORING TERMINAL PROGRAM

TECHNICAL FIELD

The present invention relates to a server apparatus, a search system, a terminal apparatus, a search method, a server program, and a terminal program. For example, the present invention relates to a concealed search system.

BACKGROUND ART

Concealed search is a technique that can perform search with encrypted data and keywords being maintained in an encrypted form.

In recent years, popularization of cloud services and the like has enabled data management on the internet. Data management on the internet, however, includes a risk of data leakage to the outside because a cloud server where data is kept may be infected by malware such as a computer virus and that a cloud service administrator may commit fraudulence. Encryption technology is available as a way of avoiding such a security threat, but this technology poses a problem that if data is simply encrypted, the data cannot be searched for. To deal with this problem, a scheme has conventionally been proposed according to which data is searched for after the data is temporarily decrypted on the cloud server. However, since the data is restored to and maintained as a plaintext in the cloud server for a predetermined period, this scheme may be insufficient as a countermeasure. Today, a variety of studies on a concealed search technique being an encryption technique are underway to enable search of data in the encrypted form. Many specific schemes as the concealed search technique have been disclosed in recent years.

The concealed search technique roughly consists of two types: a scheme that utilizes common key encryption (see, for example, Patent Literature 1, Patent Literature 2, Non-Patent Literature 1, Non-Patent Literature 2, and Non-Patent Literature 3); and a scheme that utilizes public key encryption (see, for example, Non-Patent Literature 4 and Non-Patent Literature 5). The common key encryption is also called secret key encryption or symmetric key encryption.

With a public key encryption-base concealed search technique, any entity can register data with a data center by using a public key. An entity keeping a secret key that corresponds to this public key can perform keyword search.

On the other hand, with a common key encryption-base concealed search technique, only an entity keeping a secret key can execute data registration and keyword search. It is known that with the public key encryption-base concealed search technique, a search process is performed at a higher speed compared to the existing public key encryption-base secret search technique. In particular, recent common key encryption-base secret search technique has achieved speed-up by using a data structure in which a search result called an index is stored in an encrypted form.

CITATION LIST

Patent Literature

Patent Literature 1: JP 2013-152520
Patent Literature 2: JP 2013-161154

Non-Patent Literature

Non-Patent Literature 1: R. Curtmola, J. Garay, S. Kamara, and R. Ostrovsky, "Searchable Symmetric Encryption: Improved Definitions and Efficient Constructions", ACM CCS 2006, ACM, 2006
Non-Patent Literature 2: K. Kurosawa and Y. Ohtaki, "UC-Secure Searchable Symmetric Encryption", FC 2012, Lecture Notes in Computer Science 7397, Springer, 2012
Non-Patent Literature 3: Hirano, Hattori, Ito, Kawai, Matsuda, Ohta, Sakai, "Relationships among Security Notions for Searchable Symmetric Encryption after Adding Encrypted Indexes", SCIS 2014, 3B3-3, 2014
Non-Patent Literature 4: D. Boneh, G. D. Crescenzo, R. Ostrovsky, and G. Persiano, "Public Key Encryption with Keyword Search", EUROCRYPT 2004, Lecture Notes in Computer Science 3027, Springer, 2004
Non-Patent Literature 5: M. Bellare, A. Boldyreva, and A. O'Neill, "Deterministic and Efficiently Searchable Encryption", CRYPTO 2007, Lecture Notes in Computer Science 4622, Springer, 2007

SUMMARY OF INVENTION

Technical Problem

The conventional common key encryption-base concealed search technique as disclosed in Patent Literature 1, Non-Patent Literature 1, Non-Patent Literature 2, and Non-Patent Literature 3 has a problem that the cost of generating a search query by the user being a searcher and the data size of the index query depend on the number of pieces of registration data.

More specifically, with the conventional scheme, a plurality of pieces of data can be associated with an index which the user generates in data registration. Namely, a plurality of data names can be inserted in a search result stored in the index. When many pieces of data are associated with one index, however, the generation cost of the index query and the data size of the index query increase in proportion to the number of pieces of data. To be more precisely, if N pieces of data are associated with a certain index, the generation cost of the search query and the data size of the search query increase about N times the generation cost of the search query and the data size of the search query, respectively, compared to a case where only one piece of data is correlated to a certain index.

The above problem is vital when generating the search query with using an appliance such as an IC (Integrated Circuit) card having insufficient calculation resources, or when the communication band is narrow. Although an IC card is one means that can enhance the security, as is known widely, its computing power is generally low. If the generation cost of the search query is high, it is difficult to generate a search query within a realistic time period with using an IC card. If the communication band is narrow, the cost needed to transmit the search query increases. Therefore, it is difficult to transmit a search query having a large data size.

As a means for decreasing the generation cost of the search query and the data size of the search query, the number of pieces of data corresponding to one index may be decreased and many indexes may be generated. In this case, however, the number of indexes registered with the data center increases. Then, during the search, the server at the data center needs to practice search process for many indexes, leading to a high search cost.

In short, with the conventional common key encryption-base concealed search technique, a trade-off exists between the generation cost and data size of the search query on the search requester side and the search cost on the search executer side which depends on the number of indexes. Namely, if the processing efficiency of the search requester side increases, the processing efficiency of the search executer side decreases, and vice versa.

It is, for example, an object of the present invention to increase the overall processing efficiency of the search requester side and search executer side.

Solution to Problem

A server apparatus according to one aspect of the present invention includes:

a data storage part to store a plurality of pieces of encrypted data;

an index storage part to store, as an index, a data structure which is for performing search with using a function that outputs a unique numeric value in response to an inputted keyword, the data structure having a plurality of storage areas corresponding, in one-to-one relation, to numeric values outputted from the function, and storing, for a plurality of keywords corresponding to plaintext data being pre-encryption data of one of the plurality of pieces of encrypted data, an identifier of encrypted data being post-encryption data of the plaintext data to which each keyword corresponds, in a storage area corresponding to a numeric value outputted from the function when said each keyword is inputted; and a search part to input one of the plurality of keywords to the function, identify a storage area corresponding to a numeric value outputted from the function, from the index, and acquire encrypted data corresponding to the identifier stored in the identified storage area, from the data storage part.

Advantageous Effects of Invention

In the present invention, a server apparatus being a search executer side performs search with using a function that outputs a unique numeric value in response to an inputted keyword. The server apparatus stores, as an index, a data structure which has a plurality of storage areas corresponding, in one-to-one relation, to numeric values outputted from the function. The server apparatus is capable of performing search when a keyword is inputted to the function. A search requester side can request search only by transferring the keyword to the server apparatus. Therefore, according to the present invention, the overall processing efficiency of the search requester side and search executer side increases.

BRIEF DESCRIPTION OF DRAWINGS

FIG. 2 is a table illustrating the correspondence between keywords and identifiers of search target data.

DESCRIPTION OF EMBODIMENTS

Figure 1:
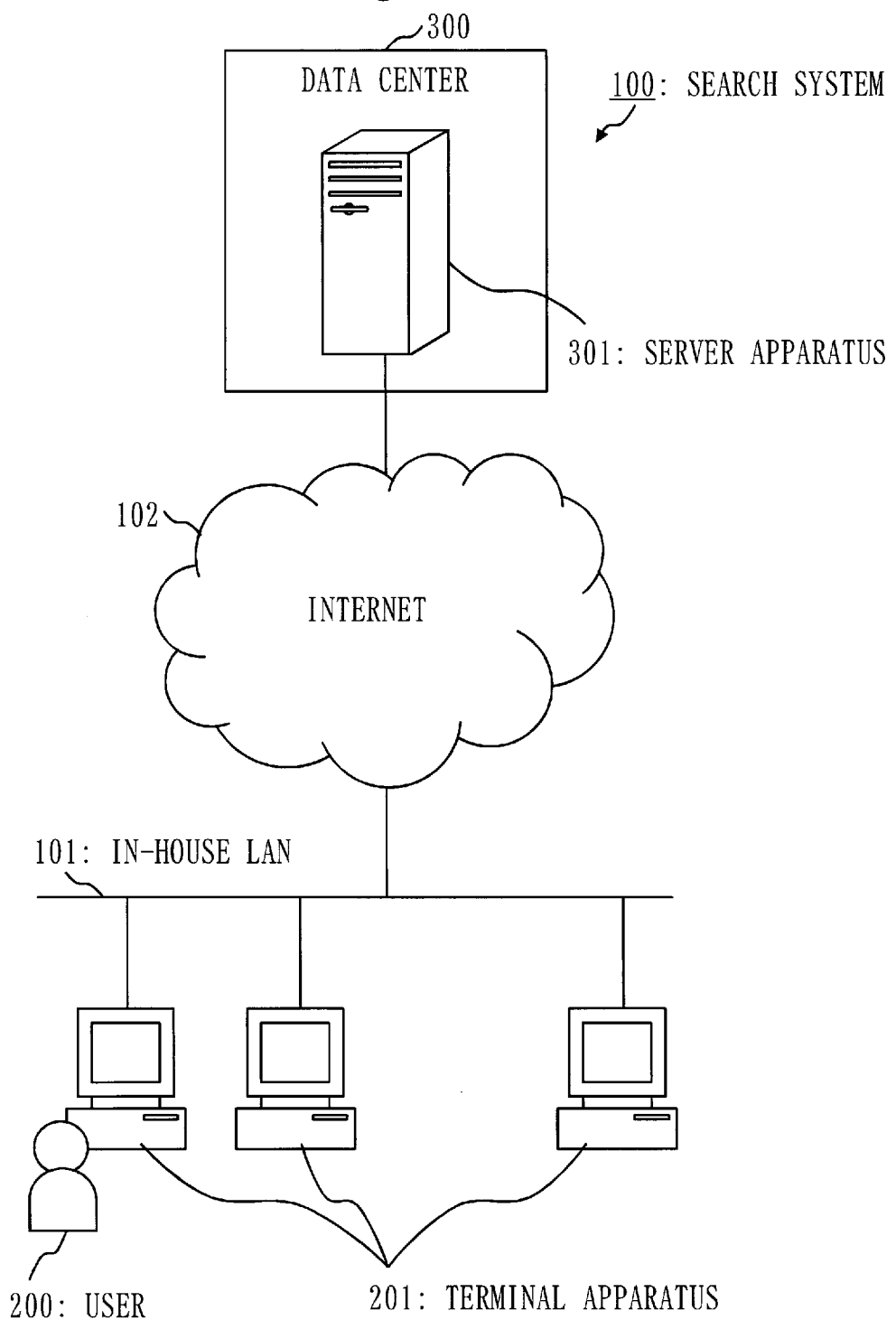
FIG. 1 is a block diagram illustrating a configuration of a search system according to Embodiment 1.

The embodiment of the present invention will be described with referring to drawings. The same or equivalent portions are denoted by the same reference numerals throughout the drawings. In the description of the embodiment, explanation of the same or equivalent portions will be appropriately omitted or simplified.

Embodiment 1

The outline of this embodiment will be described.

FIG. 1 is a block diagram illustrating a configuration of a search system 100 according to this embodiment.

As illustrated in FIG. 1, the search system 100 comprises a plurality of terminal apparatuses 201 used by a user 200, and a server apparatus 301 installed in a data center 300. The search system 100 may comprise only one terminal apparatus 201. The search system 100 may comprise a plurality of server apparatuses 301. The server apparatus 301 may be installed at a location other than the data center 300.

An in-house LAN 101 is a communication channel that connects the plurality of terminal apparatuses 201 to each other. The in-house LAN 101 is a LAN (Local Area Network) built in a company. Various servers and PCs (Personal Computers) utilized in the company are connected to the in-house LAN 101. The in-house LAN 101 is an example of a network. In place of the in-house LAN 101, another type of network may be employed. For example, if the company has offices in a plurality of buildings, a network constituted of a plurality of LANs being connected via routers, private lines, and so on is employed.

The Internet 102 is a communication channel connecting the in-house LAN 101 and the server apparatus 301. The Internet 102 is an example of the network. In place of the Internet 102, another type of network may be employed.

The plurality of terminal apparatuses 201 share information with each other via the in-house LAN 101. The terminal apparatuses 201 and the server apparatus 301 communicate with each other via the in-house LAN 101 and the Internet 102.

For example, the terminal apparatus 201 is a PC. The terminal apparatus 201 is a computer that operates as at least either one of a registration terminal which registers search target data with the server apparatus 301 and a search terminal which requests data search of the server apparatus 301. Assume that hereinafter, the terminal apparatus 201 will operate as both of the registration terminal and the search terminal for the sake of descriptive convenience.

The terminal apparatus 201 functions as an encryption apparatus. More specifically, the terminal apparatus 201 generates encrypted data and index to be described later.

The terminal apparatus 201 functions as a registration apparatus. More specifically, the terminal apparatus 201 requests the server apparatus 301 to store the encrypted data and index.

The terminal apparatus 201 functions as a search request apparatus. More specifically, the terminal apparatus 201 transmits a search seed to be described later to the server apparatus 301 and requests data search.

The terminal apparatus 201 functions as a decryption apparatus. More specifically, the terminal apparatus 201 decrypts the encrypted data which is returned from the server apparatus 301 in response to the search request.

The terminal apparatus 201 functions as a deletion request apparatus. More specifically, the terminal apparatus 201 requests the terminal apparatus 201 to delete the encrypted data or index.

The server apparatus 301 is a server having a large-capacity recording medium to store the encrypted data and index generated by the terminal apparatus 201.

The server apparatus 301 functions as a storage apparatus. More specifically, when a request for storing the encrypted data or index is received from the terminal apparatus 201, the server apparatus 301 stores the encrypted data and index.

The server apparatus 301 functions as a search apparatus. More specifically, when a search request from the terminal apparatus 201 is received, the server apparatus 301 obtains search result information from the index and transmits encrypted data indicated by the search result information to the terminal apparatus 201.

The server apparatus 301 functions as a deletion apparatus. More specifically, when a request for deleting the encrypted data or index is received from the terminal apparatus 201, the server apparatus 301 deletes the encrypted data or index it stores.

The encrypted data and the search seed have been encrypted. Therefore, the server apparatus 301 cannot obtain useful information by reviewing the contents of the encrypted data and search seed. Where only search target data need be concealed and a search keyword need not be concealed, the keyword as it is may be used as the search seed.

FIG. 2 is a table illustrating the correspondence between keywords and identifiers of search target data.

In the example of FIG. 2, data 1, data 3, and data 5 correspond to a keyword "patent". More specifically, a search in which "patent" is set as the keyword hits 3 pieces of data respectively identified as data 1, data 3, and data 5.

Likewise, data 2, data 3, data 7, and data 10 correspond to a keyword "personnel information". More specifically, a search in which "personnel information" is set as the keyword hits 4 pieces of data respectively identified as data 2, data 3, data 7, and data 10.

Likewise, data 1 and data 2 correspond to a keyword "budget". More specifically, a search in which "budget" is set as the keyword hits 2 pieces of data respectively identified as the data 1 and data 2.

In this embodiment, the conventional common key encryption-base concealed search technique that utilizes an index has been improved. More specifically, the terminal apparatus 201 used by the user 200 being the searcher need not generate a search query whose generation cost and data size increase in proportion to the number of pieces of registration data. The terminal apparatus 201 generates, in place of the search query, a search seed whose generation cost and data size do not depend on the number of pieces of registration data. The search seed is generated by encrypting a keyword. The server apparatus 301 acquires the identifier of data corresponding to the keyword from the index, with using a numeric value outputted from a function that takes as input the search seed. In the example of FIG. 2, when a search seed for the keyword "patent" is supplied from the terminal apparatus 201, the server apparatus 301 acquires three identifies of the data 1, data 3, and data 5, from the index.

As described above, in this embodiment, a series of search processes as far as identification of the identifier of the search target data from the keyword are shared by the terminal apparatus 201 and the server apparatus 301. Conventionally, a trade-off exists between the generation cost and data size of the search query, and the search cost. In this embodiment, such a trade-off need not be considered. More specifically, in this embodiment, the generation cost and data size of the information generated by the search requester side can be decreased without increasing the number of indexes, and a common key encryption-base concealed search technique having a high security can be obtained.

In this embodiment, a data registration process being a process in which the user 200 registers data with the data center 300 and a keyword search process being a process in which the user 200 searches for data in the data center 300 with using a keyword are executed in the following manner. Note that a registration person or searcher being an entity who intends to register or search for data is required to generate a secret key as a preparation and manage the secret key under strict control so the secret key will not leak to others. The user 200 corresponds to the registration person or searcher. In place of the secret key, another type of secret information may be employed.

First, the data registration process will be described.

When registering data, the user 200 who wishes to keep the data in the data center 300 by utilizing the cloud service or the like determines the keyword of the data to be registered. The user 200 generates a list of identifiers of data each keyword search will hit, as in the example of FIG. 2. The user 200 inputs the generated list and the data to be registered, to the terminal apparatus 201.

The terminal apparatus 201 generates a search seed by encrypting, with the secret key, the keyword included in the list inputted by the user 200. The terminal apparatus 201 generates an index with using the search seed. The index stores a search result. As a property required of the index, it is required that a useful search result is difficult to obtain from the index unless the user 200 has a search key or secret information equivalent to the search key.

The structure of the index can be selected arbitrarily. For example, the following arrangement can be selected as the structure of the index. More specifically, the search result of each keyword is stored in a memory area where addresses are arranged randomly. A random address is determined by a random number which is generated deterministically by inputting a search seed to a pseudo-random function or a hash function such as SHA-1 (Secure Hash Algorithm-1). "Deterministically" signifies that for the same search seed being inputted, the same value is always generated. If correspondence of the identifiers of a plurality of pieces of data to one keyword is allowed as in the example of FIG. 2, the ordinal numbers of the identifiers corresponding to the same keyword are also inputted to the hash function. For the same combination of the inputted search seed and inputted ordinal numbers, the same value will always be generated.

The index does not store the search seed itself at all but stores only the search result. Only the user 200 having the secret key can generate the search seed from the keyword and can tie the search seed and the search result. More specifically, only the user 200 having the secret key can tie the keyword and the search result. The index can be considered an inverted index of the search result.

The terminal apparatus 201 encrypts the data inputted by the user 200 in accordance with a common key cryptography such as AES (Advanced Encryption Standard) or Camellia (registered trademark). The terminal apparatus 201 registers the index and the encrypted data with the server apparatus 301 of the data center 300.

The keyword search process will be described.

The user 200 who wishes to search for encrypted data he has kept in the data center 300 inputs a keyword to the terminal apparatus 201.

Using the secret key, the terminal apparatus 201 encrypts the keyword inputted by the user 200, to generate the search seed. The terminal apparatus 201 transmits the search seed to the server apparatus 301 of the data center 300.

The server apparatus 301 of the data center 300 generates a random number with using the search seed accepted from the terminal apparatus 201. The random number corresponds to the address of the index. If correspondence of the identifiers of the plurality of pieces of data to one keyword is allowed as in the case of FIG. 2, the server apparatus 301 generates a plurality of random numbers. The server apparatus 301 identifies one or a plurality of addresses in the index which correspond to the generated random numbers. The server apparatus 301 obtains the search result from the memory area of the identified address. After that, the server apparatus 301 reads out one or a plurality of pieces of encrypted data corresponding to the identifier(s) indicated by the search result. The server apparatus 301 transmits the read encrypted data to the terminal apparatus 201.

The terminal apparatus 201 decrypts the accepted encrypted data with using the common key cryptography.

Since the data registration process and the keyword search process as described above are executed, if the data is encrypted and stored in the data center 300, the data in the encrypted form can be searched for without leakage of information concerning the contents of the data. Even the server apparatus 301 of the data center 300 cannot access the information concerning the contents of the data.

In this embodiment, during the search, the terminal apparatus 201 of the user 200 being the searcher does not generate a search query but instead generates the search seed that does not depend on the number of pieces of registration data. The server apparatus 301 of the data center 300 generates the search key being a random number, from the search seed. The server apparatus 301 searches for the index in the search key. Therefore, even when many pieces of data are registered for one index, the generation cost and data size of the search seed are not affected. More specifically, in this embodiment, the search seed generation cost can be decreased unlike with the conventional search query, and the data size of the search seed can be decreased.

This embodiment will be described in detail hereinafter.

Description of Configuration

As illustrated in FIG. 1, the search system 100 includes the terminal apparatuses 201 and the server apparatus 301. The configuration of the terminal apparatus 201 and the configuration of the server apparatus 301 will be described sequentially hereinafter.

Figure 3:
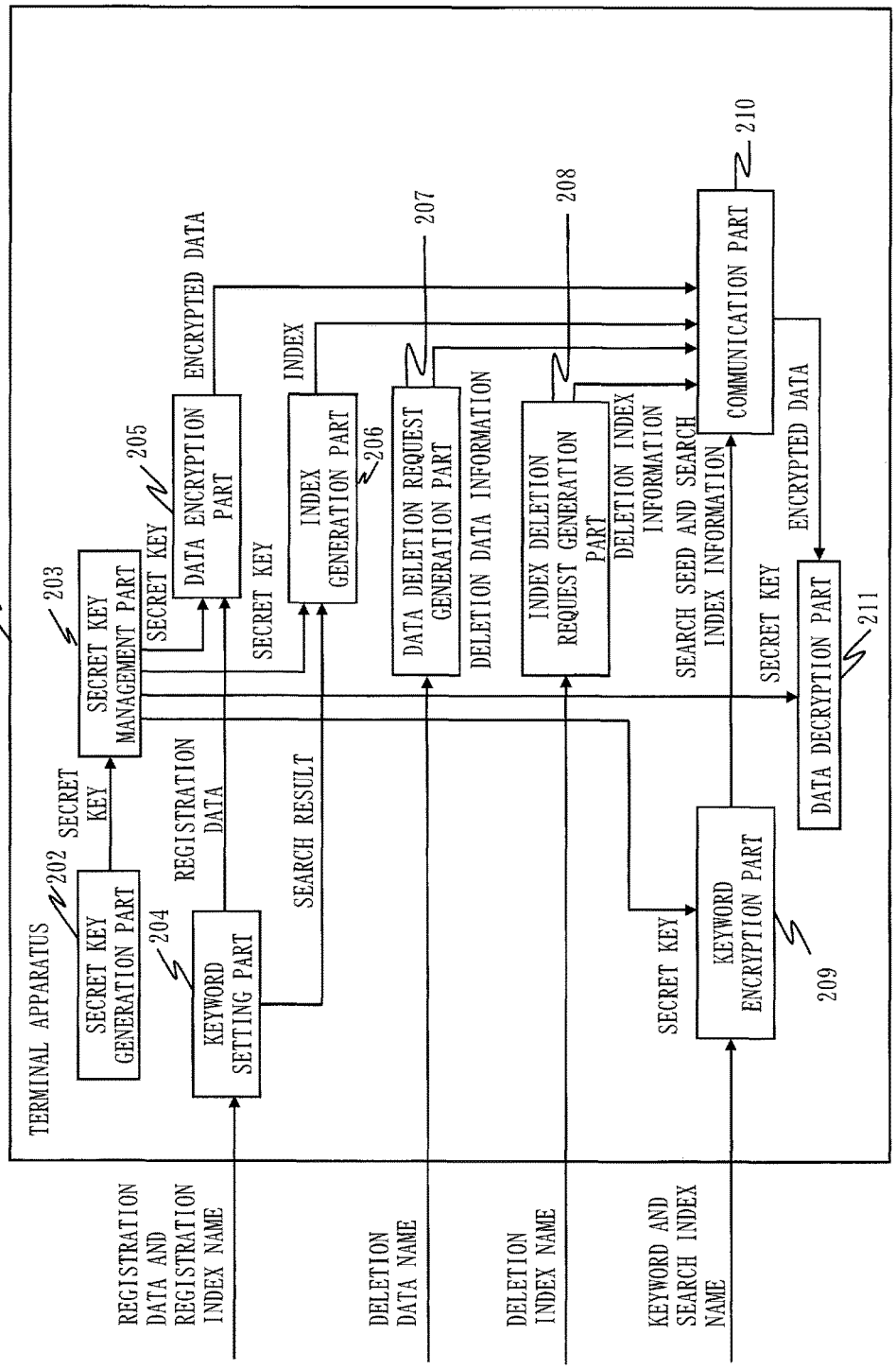
FIG. 3 is a block diagram illustrating a configuration of a terminal apparatus according to Embodiment 1.

FIG. 3 is a block diagram illustrating a configuration of the terminal apparatus 201.

As illustrated in FIG. 3, the terminal apparatus 201 includes a secret key generation part 202, a secret key management part 203, a keyword setting part 204, a data encryption part 205, an index generation part 206, a data deletion request generation part 207, an index deletion request generation part 208, a keyword encryption part 209, a communication part 210, and a data decryption part 211.

Although not illustrated, the terminal apparatus 201 includes a recording medium which stores data to be used by the respective parts of the terminal apparatus 201.

The secret key generation part 202 generates an encryption key EK according to the common key cryptograph for encrypting data, and an index key IK for generating an index I. The encryption key EK and the index key IK are secret keys of the terminal apparatus 201 and are managed under strict control so that they will not be disclosed except to the user 200 who registers, adds, and deletes data, or searches for a keyword. Although the common key cryptography is employed in this embodiment, a public key cryptography such as RSA (registered trademark) cryptography or the like may be employed. In the public key cryptography, while a public key to be used for encryption may be made public, a secret key to be used for decryption is managed under strict control.

The secret key management part 203 stores, in the recording medium, the encryption key EK and index key IK generated by the secret key generation part 202.

The keyword setting part 204 automatically extracts a plurality of keywords from a plurality of pieces of plaintext data $D\_1$ to $D_{13}$ n inputted by the user 200. For each extracted keyword, the keyword setting part 204 generates search result information like the example of FIG. 2. The keyword setting part 204 includes in the search result information the registration index name inputted by the user 200 as well. The registration index is not necessarily inputted by the user 200 but may be omitted. The keyword need not be extracted automatically. For example, together with the registration data being plaintext data, a keyword corresponding to the registration data may be inputted by the user 200 simultaneously. In this case, the keyword setting part 204 generates the search result information by checking the relation between the data and each keyword inputted by the user 200. Alternatively, the user 200 inputs the search result information directly.

Using the encryption key EK stored in the secret key management part 203, the data encryption part 205 encrypts the registration data accepted from the keyword setting part 204. More specifically, the data encryption part 205 generates a plurality of pieces of encrypted data $C\_1$ to $C\_n$ by encrypting the plurality of pieces of plain data $D\_1$ to $D\_n$ with using the encryption key EK.

The index generation part 206 generates, as the index I, the data structure for performing search with using a function H that outputs a unique numeric value in response to the inputted keyword. The index I is a data structure having a plurality of storage areas corresponding, in one-to-one relation, to numeric values outputted from the function H. The index I is a data structure which stores, for a plurality of keywords corresponding to one of the plurality of pieces of plain data $D\_1$ to $D\_n$, the identifier of encrypted data $C\_i$ being post-encryption data of the plaintext data $D\_i$ to which each keyword corresponds, in a storage area corresponding to a numeric value that is outputted from the function H when the corresponding keyword is inputted.

The index generation part 206 generates the index I with using the index key IK stored in the secret key management part 203, based on the search result information generated by the keyword setting part 204. More specifically, while the input to the function H may be a plaintext keyword, in this embodiment, the input to the function H is a search seed being an encrypted keyword, so that the keyword is concealed from the server apparatus 301. The index generation part 206 encrypts, for a plurality of keywords, each keyword with using the index key IK. The index generation part 206 inputs the encrypted keyword to the function H. The index generation part 206 generates, as the index I, a data structure which stores, in the storage area corresponding to the numeric value outputted from the function H, the identifier of the encrypted data $C\_i$ being post-encryption data of plaintext data $D\_i$ to which the encrypted keyword corresponds.

One keyword may correspond to only one piece of plaintext data, but in this embodiment, the input to the function H includes a numeric value other than the keyword, so that one keyword can correspond to two or more pieces of plaintext data. More specifically, the function H is a function that outputs a unique numeric value in response to a combination of an inputted keyword and an inputted numeric value. The index generation part 206 inputs, for two pieces or more of plaintext data to which a common keyword corresponds, the common keyword, and a numeric value for identifying each piece of plaintext data $D\_i$, to the function H. The index generation part 206 generates, as the index I, the data structure which stores the identifier of the encrypted data $C\_i$ being post-encryption data of each piece of plaintext data $D\_i$, in the storage area corresponding to the numeric value outputted from the function H.

The data deletion request generation part 207 generates deletion data information including a deletion data name being an identifier inputted from the user 200. The deletion data information is information for deleting encrypted data registered with the server apparatus 301.

The index deletion request generation part 208 generates deletion index information including the deletion index name inputted from the user 200. The deletion index information is information for deleting the index I registered with the server apparatus 301.

The keyword encryption part 209 generates, with using the index key IK stored in the secret key management part 203, a search seed from the keyword inputted from the user 200. Namely, the keyword encryption part 209 encrypts the keyword with using the index key IK. The keyword encryption part 209 also generates search index information including the search index name inputted from the user 200. The search index name need not always be inputted by the user 200 and may be omitted.

The search seed is interim information of information that is necessary for performing search. The index I cannot be searched for with using the search seed as it is. The search seed is information only the user 200 having the index key IK, being a secret key, can generate. The server apparatus 301 can generate the search key being information necessary for performing search, with using only the search seed. The server apparatus 301 can search for the index based on the generated search key.

The communication part 210 transmits, to the server apparatus 301, the plurality of pieces of encrypted data $C\_1$ to $C\_n$ sent from the data encryption part 205, the index I sent from the index generation part 206, the deletion data information sent from the data deletion request generation part 207, the deletion index information sent from the index deletion request generation part 208, and the search seed and search index information sent from the keyword encryption part 209. More specifically, the communication part 210 transmits the plurality of pieces of encrypted data $C\_1$ to $C\_n$ generated by the index generation part 206 and the index I generated by the index generation part 206 to the server apparatus 301. The communication part 210 transmits the keyword encrypted by the keyword encryption part 209 to the server apparatus 301.

The communication part 210 receives the encrypted data $C\_i$ being one of the plurality of pieces of encrypted data $C\_1$ to $C\_n$ from the server apparatus 301.

The data decryption part 211 decrypts, with using the encryption key EK stored in the secret key management part 203, the encrypted data $C\_i$ received from the communication part 210, thereby acquiring the plaintext data $C\_i$. The data decryption part 211 outputs the acquired plaintext data $C\_i$ to a display, a printer, or the like. More specifically, the data decryption part 211 decrypts the encrypted data $C\_i$ received by the communication part 210, with using a decryption key that corresponds to the encryption key EK.

Figure 4:
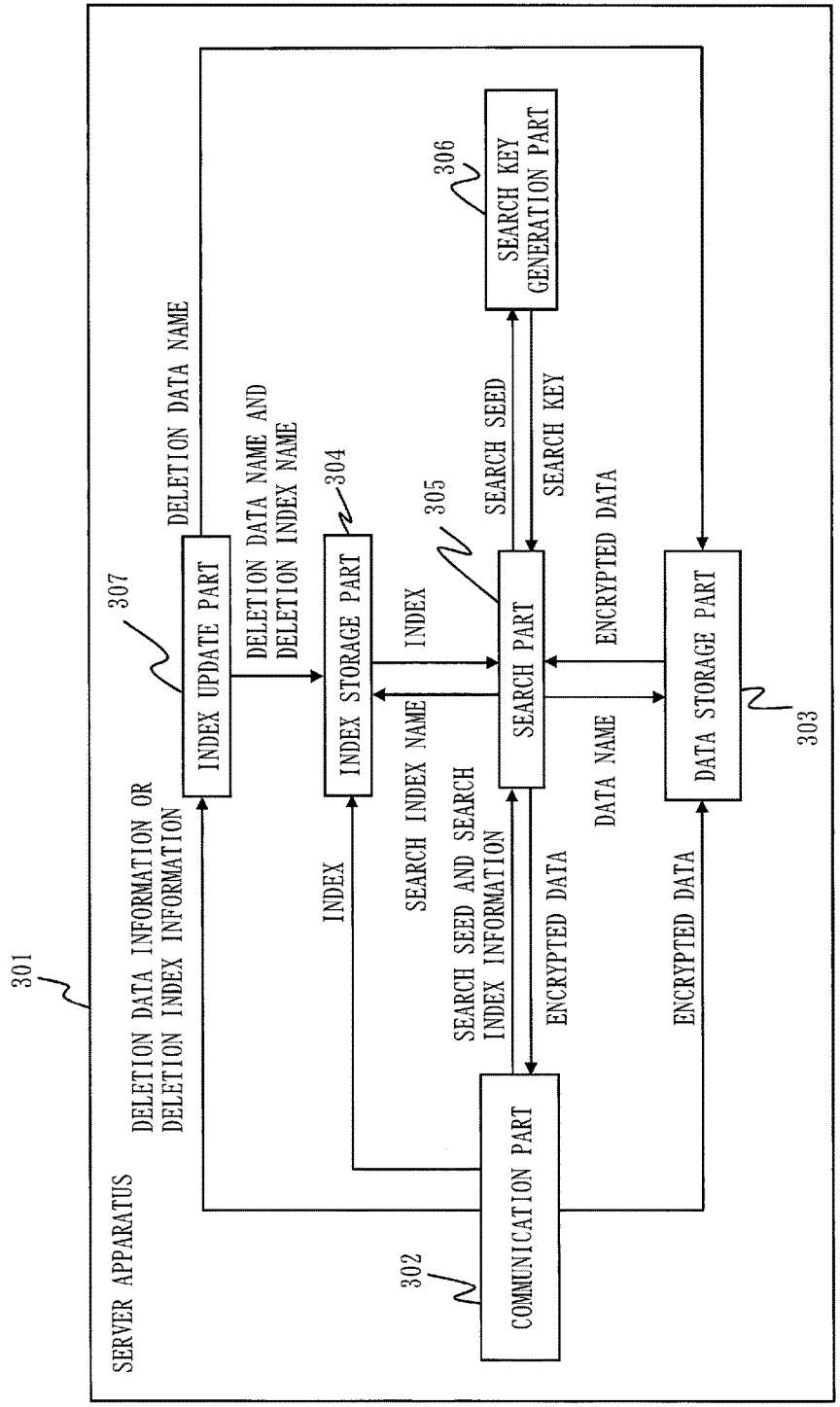
FIG. 4 is a block diagram illustrating a configuration of a server apparatus according to Embodiment 1.

FIG. 4 is a block diagram illustrating a configuration of the server apparatus 301.

As illustrated in FIG. 4, the server apparatus 301 includes a communication part 302, a data storage part 303, an index storage part 304, a search part 305, a search key generation part 306, and an index update part 307.

Although not illustrated, the server apparatus 301 includes a recording medium storing data to be used by the respective parts of the server apparatus 301.

The communication part 302 receives, from the terminal apparatus 201, the plurality of pieces of encrypted data $C\_1$ to $C\_n$, the index I, the deletion data information, the deletion index information, the search seed being the keyword encrypted by the terminal apparatus 201 with using the index key IK, and the search index information.

The communication part 302 transmits the encrypted data $C\_i$ acquired by the search part 305 to the terminal apparatus 201.

The data storage part 303 stores in the recording medium the plurality of pieces of encrypted data $C\_1$ to $C\_n$ sent from the communication part 302. Namely, the data storage part 303 stores the plurality of pieces of encrypted data $C\_1$ to $C\_n$. As described above, the plurality of pieces of encrypted data $C\_1$ to $C\_n$ are post-encryption data of the plurality of pieces of plaintext data $D\_1$ to $D\_n$ encrypted by the terminal apparatus 201 that keeps the encryption key EK, with using the encryption key EK. When a data name being an identifier is sent from the search part 305, the data storage part 303 reads out encrypted data $C\_i$ corresponding to the data name from the recording medium. The data storage part 303 sends the read-out encrypted data to the search part 305. The data storage part 303 deletes the encrypted data $C\_i$ corresponding to the deletion data name sent from the index update part 307, from the recording medium.

The index storage part 304 stores, in the recording medium, the index I sent from the communication part 302. More specifically, the index storage part 304 stores, as the index I, the data structure for performing search with using the function H that outputs a unique numeric value in response to the inputted keyword. As described above, the index I is a data structure having a plurality of storage areas corresponding, in one-to-one relation, to the numeric values outputted from the function H. The index I is a data structure which stores, for a plurality of keywords corresponding to the plaintext data $D\_i$ being pre-encryption data of one of a plurality of pieces of encrypted data $C\_1$ to $C\_n$, the identifier of encrypted data $C\_i$ being post-encryption data of the plaintext data $D\_i$ to which each keyword corresponds, in a storage area corresponding to the numeric value outputted from the function H when the corresponding keyword is inputted. The index I is a data structure generated by the terminal apparatus 201.

As described above, the input to the function H may be a plaintext keyword, but in this embodiment, the input to the function H is a search seed being an encrypted keyword, so that the keyword is concealed from the server apparatus 301. More specifically, the function H is a function that outputs a unique numeric value in response to a keyword encrypted by the terminal apparatus 201 that keeps the index key IK, with using the index key IK.

As described above, one keyword may correspond to only one piece of plaintext data, but in this embodiment, the input to the function H includes a numeric value other than the keyword, so that one keyword can correspond to two or more pieces of plaintext data. More specifically, the function H is a function that outputs a unique numeric value in response to a combination of an inputted keyword and an inputted numeric value. The index I is a data structure which stores the identifier of the encrypted data $C\_i$ being post-encryption data of each piece of plaintext data $D\_i$, in the storage area corresponding to the numeric value that is outputted from the function H when, for two or more pieces of plaintext data to which a common keyword corresponds, the common keyword, and a numeric value for identifying each piece of plaintext data $D\_i$ are inputted.

The index storage part 304 reads out the index I corresponding to the search index name sent from the search part 305, from the recording medium. The index storage part 304 sends the read-out index I to the search part 305.

The index storage part 304 receives the deletion data name from the index update part 307. The index storage part 304 reads out the index I from the recording medium. The index storage part 304 searches for an address of the index I which includes the received deletion data name. When such an address is found, the index storage part 304 deletes the deletion data name from that address.

The index storage part 304 deletes the index I corresponding to the deletion index name sent from the index update part 307, from the recording medium.

The search part 305 extracts the search index name from the search index information sent from the communication part 302. The search part 305 sends the extracted search index name to the index storage part 304. The search part 305 sends the search seed sent from the communication part 302, to the search key generation part 306. The function H is implemented in the search key generation part 306. The search part 305 searches for the index I sent from the index storage part 304, with using the search key sent from the search key generation part 306, and extracts the search result. After that, the search part 305 sends the extracted data name to the data storage part 303. The search part 305 sends the encrypted data $C_{13}i$ sent from the data storage part 303, to the communication part 302. More specifically, the search part 305 inputs one of the plurality of keywords to the function H. The search part 305 identifies the storage area corresponding to the numeric value outputted from the function H, from the index I. The search part 305 acquires the encrypted data $C\_i$ corresponding to the identifier stored in the specified storage area, from the data storage part 303. In this embodiment, the search part 305 inputs the keyword received by the communication part 302, to the function H.

As described above, in this embodiment, an input to the function includes a numeric value other than the keyword, so that one keyword can correspond to two or more pieces of plaintext data. The range of the numeric value is preset. For example, the minimum value is 1. The maximum value is the number of the pieces of plaintext data to which one keyword is allowed to correspond. The search part 305 inputs a numeric value falling within a preset range, one by one to the function H together with one of the plurality of keywords. If a storage area corresponding to the numeric value outputted from the function H exists in the index I, the search part 305 acquires encrypted data $C\_i$ corresponding to the identifier stored in the existing storage area, from the data storage part 303.

The search key generation part 306 generates the search key from the search seed sent from the search part 305. The search key generation part 306 sends the generated search key to the search part 305. The search key generation part 306 may be regarded as the function H itself.

The index update part 307 extracts the deletion data name from the deletion data information sent from the communication part 302. The index update part 307 sends the extracted deletion data name to the data storage part 303 and the index storage part 304. More specifically, when the identifier of the encrypted data $C\_i$ deletion is specified by the terminal apparatus 201, the index update part 307 deletes the encrypted data $C\_i$ corresponding to the specified identifier from the data storage part 303. The index update part 307 also identifies the storage area where the specified identified is stored, from the index. The index update part 307 deletes the contents of the identified storage area.

The index update part 307 extracts the deletion index name from the deletion index information sent from the communication part 302. The index update part 307 sends the extracted deletion index name to the index storage part 304.

The index generation part 206 of the terminal apparatus 201 may generate only one index I, but in the following description, the index generation part 206 generates a plurality of indexes I. Each index I is identified by an index name such as a registration index name, a search index name, or a deletion index name.

When requesting search, the user 200 may input one or a plurality of search index names, or may omit input of the search index name. When input of the search index name is omitted, the keyword encryption part 209 of the terminal apparatus 201 has the search index information include information that all indexes I will be searched for.

Upon reception of the deletion data name from the index update part 307, the index storage part 304 reads out all the indexes I from the recording medium. The index storage part 304 searches for an index I which includes the received deletion data name. When such an index I is found, the index storage part 304 deletes the deletion data name from the corresponding address of that index I.

*Description of Operation*

The operation of the search system 100 that corresponds to the search method according to this embodiment will be described hereinafter.

Figure 5:
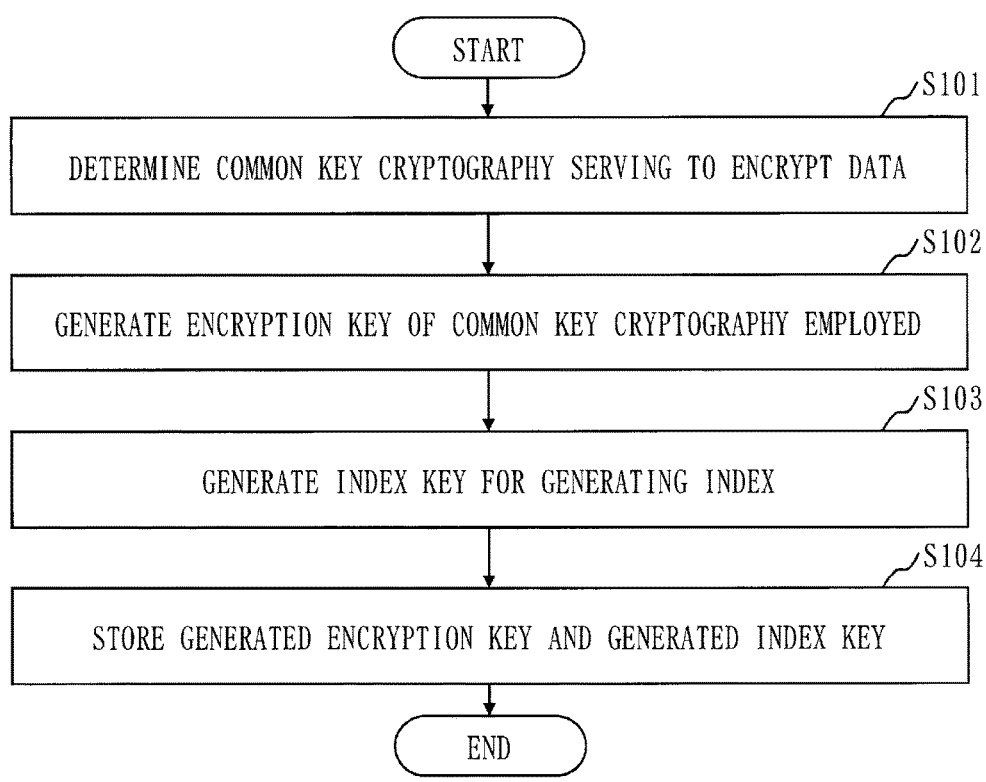
FIG. 5 is a flowchart illustrating an initial setting process of the search system according to Embodiment 1.

FIG. 5 is a flowchart illustrating an initial setting process of the search system 100.

S101 to S104 of FIG. 5 are processes executed by the terminal apparatus 201 being a computer, under control of a terminal program according to this embodiment. S101 to S104 are executed by the terminal apparatus 201 before a data registration process and a data search process are executed.

In S101, the secret key generation part 202 determines a common key cryptography for encryption of data. As the common key cryptography, AES, Camellia (registered trademark), or the like can be chosen. The common key cryptography may be determined in advance. As described above, a public key cryptography may be chosen in place of the common key cryptography. The common key cryptography determined in S101 will be simply referred to as "common key cryptography" hereinafter.

In S102, the secret key generation part 202 generates the encryption key EK of the common key cryptography for encryption of data. In this embodiment, the encryption key EK is a decryption key at the same time. If a public key cryptography is chosen in S101, the secret key generation part 202 generates a secret key that corresponds to the encryption key EK being a public key, as a decryption key.

In S103, the secret key generation part 202 generates the index key IK for generating the index I and the search seed.

In S104, the secret key management part 203 stores, in the recording medium, the encryption key EK generated in S102 and the index key IK generated in S103.

With S104, the initial setting process of the search system 100 ends.

Figure 6:
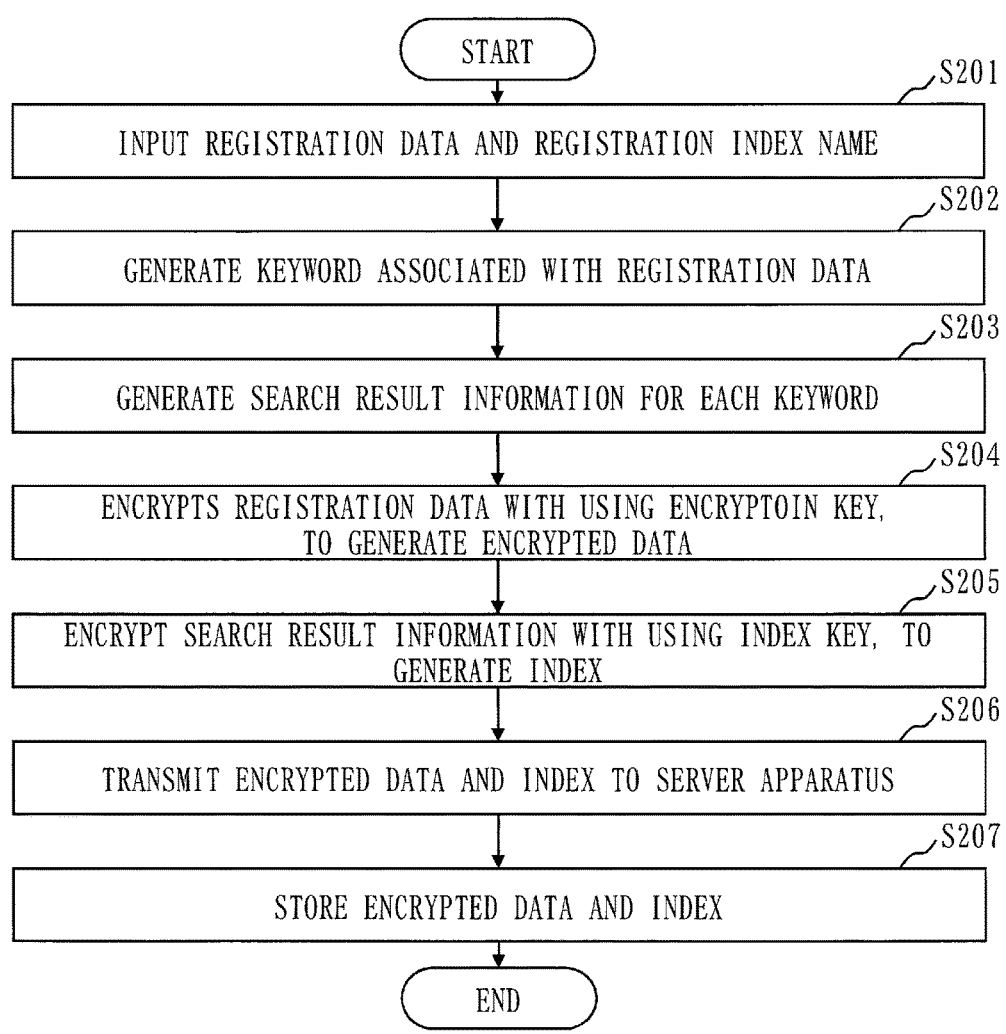
FIG. 6 is a flowchart illustrating a data registration process of the search system according to Embodiment 1.

FIG. 6 is a flowchart illustrating the data registration process of the search system 100.

S201 to S206 of FIG. 6 are processes executed by the terminal apparatus 201 being the computer, under control of the terminal program according to this embodiment. S204 is a data encryption process, S205 is an index generation process, and S206 is a communication process. In S201 to S206, the encrypted data $C\_1$ to $C\_n$ being the search target, and the index I for searching for data as a search target, are generated by the terminal apparatus 201.

S207 of FIG. 6 is a process executed by the server apparatus 301 being a computer, under control of a server program according to this embodiment. S207 is a communication process. In S207, the encrypted data $C\_1$ to $C\_i$, being the search target, and the index I are registered with the server apparatus 301.

In S201, the user 200 specifies registration data and registration index name to the terminal apparatus 201 with using a keyboard, a mouse, or the like. The keyword setting part 204 accepts input of the registration data and registration index name. The registration data is non-encrypted data being a search target, that is, plaintext data $D\_1$ to $D\_n$. Only one pieces of registration data may be specified. The registration index name is a name assigned to the index I which is associated with pieces of registration data that are inputted at the same time. The registration index name need not always be inputted. The registration index name may be or need not be automatically assigned by the keyword setting part 204.

In S202, the keyword setting part 204 generates at least one keyword associated with the registration data inputted in S201. For example, the keyword setting part 204 extracts a noun from the registration data automatically as a keyword, or accepts input of a keyword directly specified by the user 200.

In S203, the keyword setting part 204 generates search result information for each keyword generated in S202. The search result information is information indicating the data name of registration data that matches the keyword, as in the example of FIG. 2.

In S204, the data encryption part 205 encrypts the registration data inputted in S201, with using the encryption key EK stored in the secret key management part 203, thereby generating the encrypted data $C\_1$ to $C\_i$.

In S205, the index generation part 206 encrypts the search result information generated in S203, with using the index key IK stored in the secret key management part 203, thereby generating the index I.

In S206, the communication part 210 transmits the encrypted data $C\_1$ to $C\_n$ generated in S204 and the index I generated in S205, to the server apparatus 301.

In S207, the communication part 302 receives the encrypted data $C\_1$ to $C\_n$ and index I transmitted in S206. After that, the data storage part 303 stores the encrypted data $C\_1$ to $C\_n$, in the recording medium. The index storage part 304 stores the index I, in the recording medium.

With S207, the data registration process of the search system 100 ends. As the encrypted data $C\_1$ to $C\_n$ and the index I have been encrypted, the registration data and the keyword are concealed. Data can be additionally registered in accordance with the same procedure as that described above.

Figure 7:
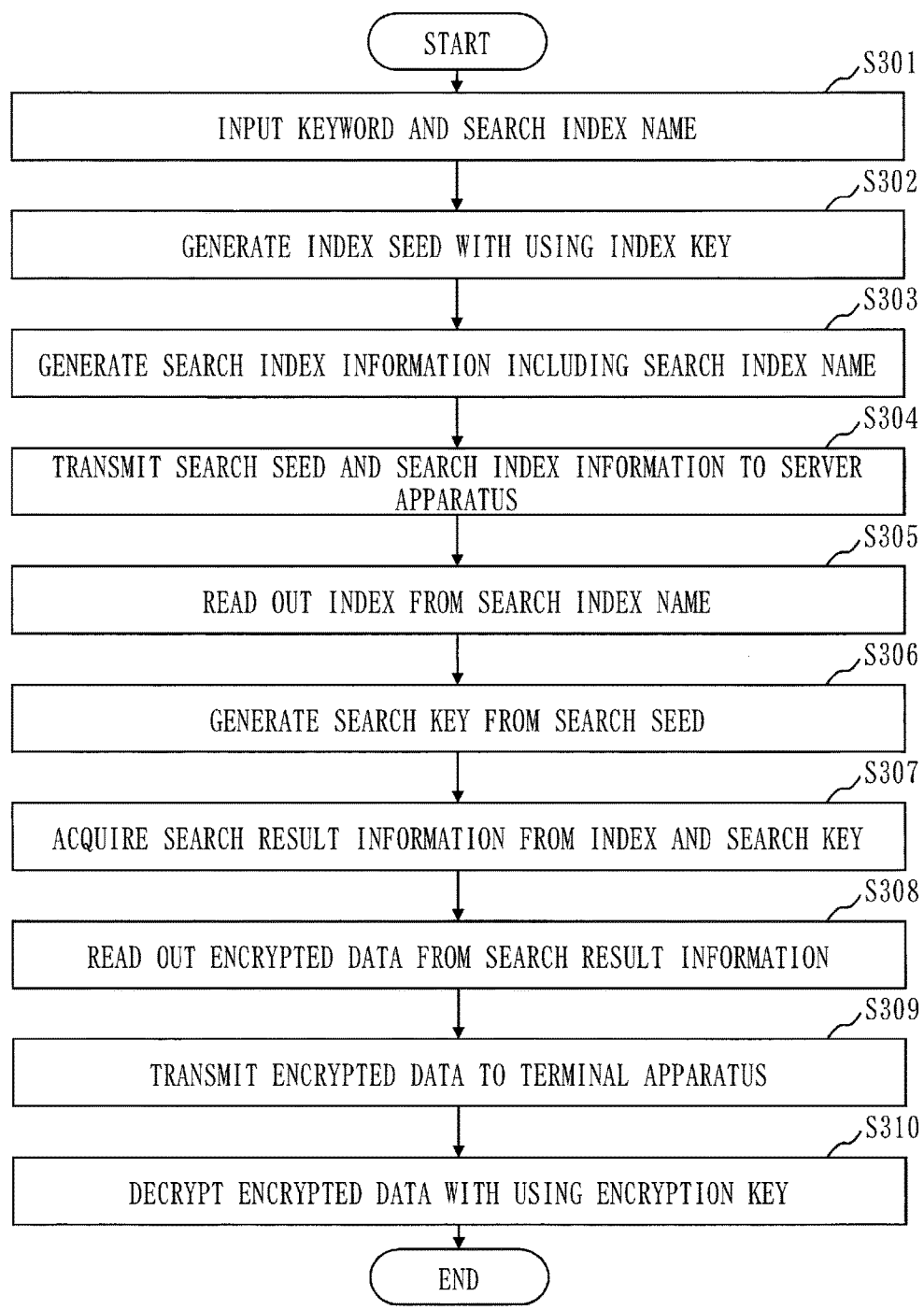
FIG. 7 is a flowchart illustrating a data search process of the search system according to Embodiment 1.

FIG. 7 is a flowchart illustrating the data search process of the search system 100.

S301 to S304 of FIG. 7 are processes executed by the terminal apparatus 201 being a computer, under control of the terminal program according to this embodiment. S302 and S303 are a keyword encryption process, S304 and part of S10 are a communication process, and the remaining part of S310 is a data decryption process. In S301 to S304, the search seed is generated by the terminal apparatus 201.

S305 to S309 of FIG. 7 are processes executed by the server apparatus 301 being a computer, under control of the server program according to this embodiment. Part of S305 and S309 are a communication process, and the remaining part of S305 and S306 to S308 are a search process. In S305 to S309, a search key is generated by the server apparatus 301 with using the search seed. With using the search key and the index I which is registered with the server apparatus 301, the encrypted data $C\_i$ registered with the server apparatus 301 is searched for.

In S301, the user 200 specifies in the terminal apparatus 201 one or a plurality of keywords and one or a plurality of search index names, with using the keyboard, mouse, or the like. The keyword encryption part 209 accepts input of the keyword and the search index name.

In S302, with using the index key IK stored in the secret key management part 203, the keyword encryption part 209 generates a search seed from the keyword inputted in S301. The search seed is information used by the server apparatus 301 to generate the search key.

In S303, the keyword encryption part 209 generates the search index information including the search index name inputted in S301.

In S304, the communication part 210 transmits the search seed generated in S302 and the search index information generated in S303 to the server apparatus 301.

In S305, the communication part 302 receives the search seed and search index information transmitted in S304. After that, the search part 305 extracts the search index name from the search index information sent from the communication part 302. The search part 305 reads out an index I corresponding to the extracted search index name from the index storage part 304. If there are a plurality of search index names, the search part 305 reads out a plurality of indexes I.

In S306, the search key generation part 306 generates the search key with using the search seed sent from the search part 305 and received in S305.

In S307, the search part 305 searches for the index I read out in S305, with using the search key generated in S306. The search part 305 extracts search result information including the data name.

In S308, the search part 305 reads out encrypted data $C_{13}$ i from the data storage part 303 based on the search result information extracted in S307.

In S309, the communication part 302 transmits the encrypted data C_i read out in S308 to the terminal apparatus 201.

In S310, the communication part 210 receives the encrypted data C_i transmitted in S309. After that, the data decryption part 211 decrypts the encrypted data C_i sent from the communication part 210, with using the encryption key EK stored in the secret key management part 203. The data decryption part 211 outputs plaintext data D_i obtained by decryption to a display, printer, or the like.

With S310, the data search process of the search system 100 ends.

Figure 8:
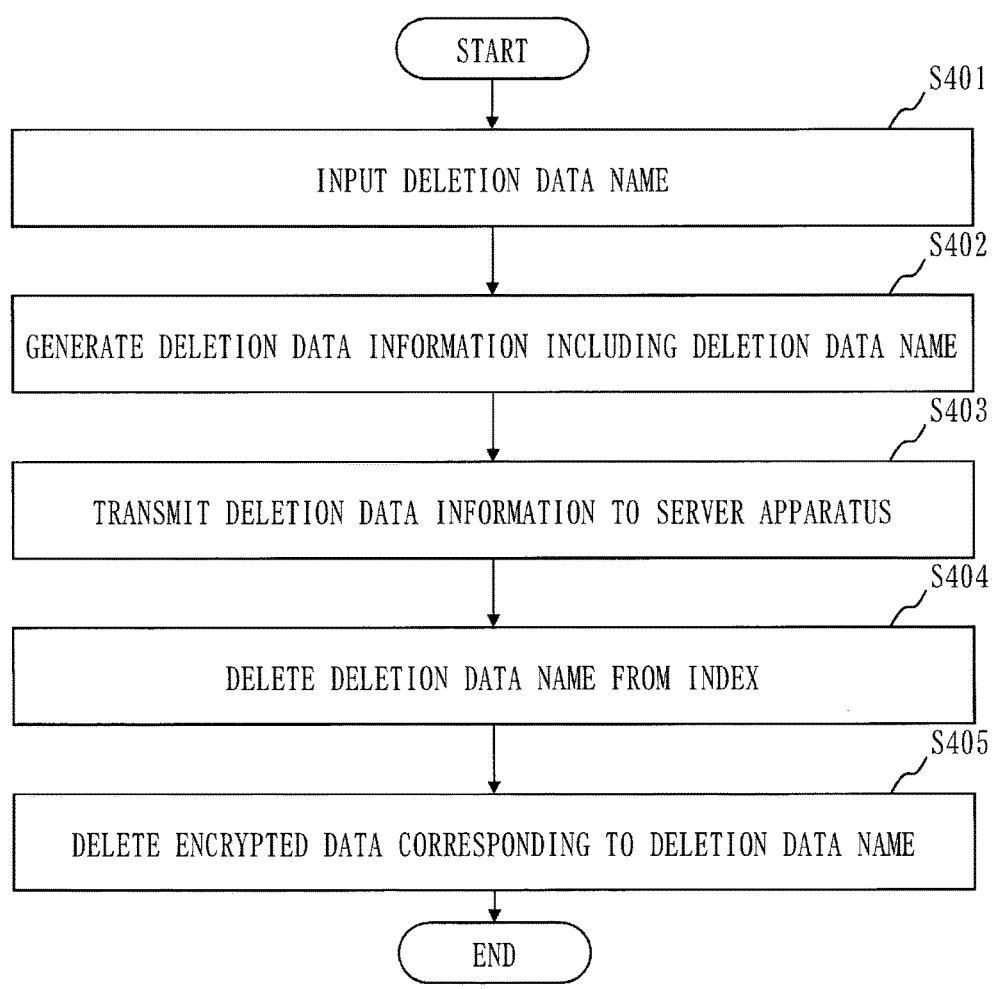
FIG. 8 is a flowchart illustrating a data deletion process of the search system according to Embodiment 1.

FIG. 8 is a flowchart illustrating a data deletion process of the search system 100.

S401 to S403 of FIG. 8 are processes executed by the terminal apparatus 201 being a computer, under control of the terminal program according to this embodiment. S403 is a communication process.

S404 to S405 of FIG. 8 are processes executed by the server apparatus 301 being a computer, under control of the server program according to this embodiment. Part of S404 is a communication process, and the remaining part of S404 and S405 are an index update process. In S404 and S405, part of the registration data registered with the server apparatus 301 is deleted.

In S401, the user 200 specifies in the terminal apparatus 201 one or a plurality of deletion data names with using the keyboard, mouse, or the like. The data deletion request generation part 207 accepts input of the deletion data name.

In S402, the data deletion request generation part 207 generates deletion data information that includes the deletion data name inputted in S401.

In S403, the communication part 210 transmits the deletion data information generated in S402 to the server apparatus 301.

In S404, the communication part 302 receives the deletion data information transmitted in S403. The index update part 307 extracts the deletion data name from the deletion data information sent from the communication part 302. The index storage part 304 is controlled by the index update part 307, so as to read out all the indexes I from the recording medium, thereby finding an index I that includes the deletion data name sent from the index update part 307. When such an index I is found, the index storage part 304 deletes the deletion data name from the corresponding address of that index I.

In S405, the data storage part 303 is controlled by the index update part 307, so as to delete, from the recording medium, encrypted data $C_{13}$ i corresponding to the deletion data name sent from the index update part 307.

With S405, the data deletion process of the search system 100 ends.

Figure 9:
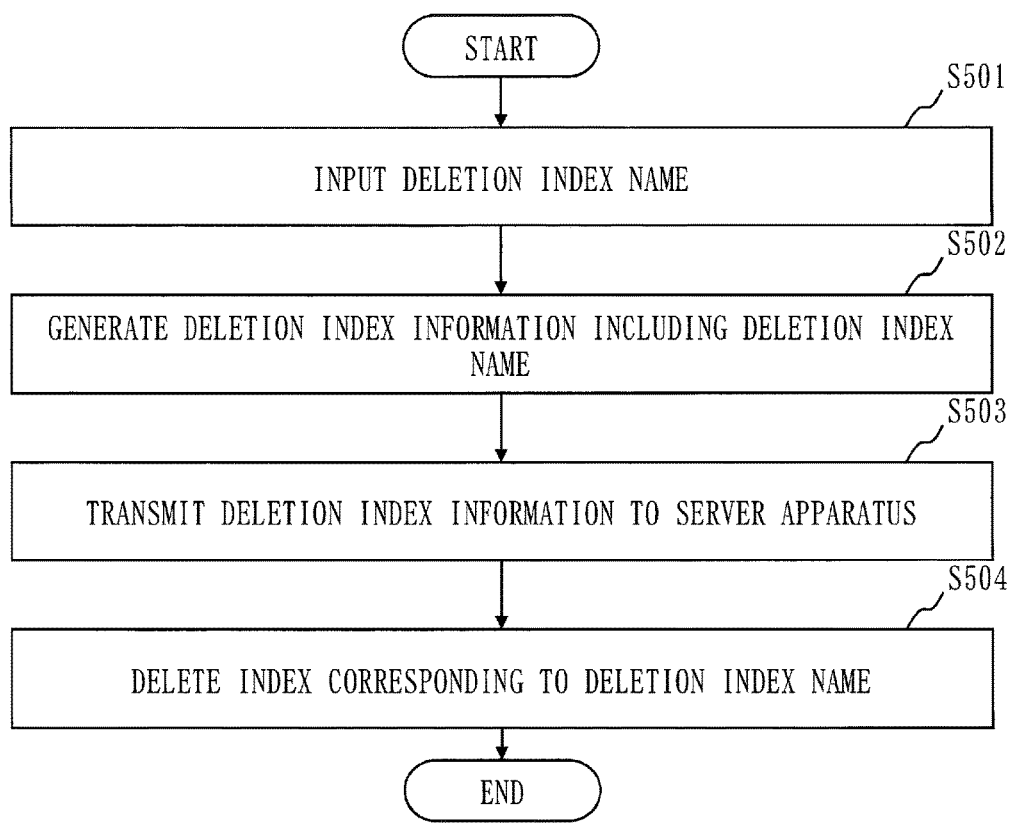
FIG. 9 is a flowchart illustrating an index deletion process of the search system according to Embodiment 1.

FIG. 9 is a flowchart illustrating an index deletion process of the search system 100.

S501 to S503 of FIG. 9 are processes executed by the terminal apparatus 201 being a computer, under control of the terminal program according to this embodiment. S503 is a communication process.

S504 of FIG. 9 is a process executed by the server apparatus 301 being a computer, under control of the server program according to this embodiment. Part of S504 is a communication process, and the remaining part of S504 is an index update process. In S504, part of the index I is deleted from the server apparatus 301.

In S501, the user 200 specifies, in the terminal apparatus 201, one or a plurality of deletion index names with using the keyboard, mouse, or the like. The index deletion request generation part 208 accepts input of the deletion index name.

In S502, the index deletion request generation part 208 generates deletion index information that includes the deletion index name inputted in S501.

In S503, the communication part 210 transmits the deletion index information generated in S502 to the server apparatus 301.

In S504, the communication part 302 receives the deletion index information transmitted in S503. The index update part 307 extracts the deletion index name from the deletion index information sent from the communication part 302. The index storage part 304 is controlled by the index update part 307 so as to delete, from the recording medium, the index I corresponding to the deletion index name sent from the index update part 307.

With S504, the index deletion process of the search system 100 ends.

The data deletion process illustrated in FIG. 8 and the index deletion process illustrated in FIG. 9 may be executed simultaneously. For example, it is possible to send deletion request information including both a deletion data name and a deletion index name, from the terminal apparatus 201 to the server apparatus 301.

A specific example of the operation of the search system 100 will be described hereinafter.

Symbols employed in the description of the specific example will be determined as follows.

The data name of the data D_i being plaintext data, and the data name of the encrypted data C_i obtained by encrypting the plaintext data data D_i, will be expressed as "id(D_i)". Note that the data name id(D_i) is a mere identifier and does not represent the contents of the data $D_{13}$ i. Namely, the contents of the data D_i cannot be known from the data name id(D_i).

The data name id(D_i) is supposed to have a bit length of u. If the bit length of the inputted data name is shorter than u, the data name id(D_i) is rendered to have u bits by, for example, concatenating several integers 0 to the head of the data name.

A keyword w is supposed to have a bit length of x. If the bit length of the inputted keyword is shorter than x, the keyword w is rendered to have x bits by, for example, concatenating several integers 0 to the head of the keyword.

The encryption key EK is supposed to have a bit length of k1, and the index key IK is supposed to have a bit length of k2.

An encryption function Enc of the common key cryptography takes, as an input value, a k1-bit key EK and M-bit plaintext data D_i, and outputs M-bit encrypted data C_i. A decryption function Dec of the common key cryptography takes, as an input value, a k1-bit key EK and M-bit encrypted data C_i, and outputs M-bit plaintext data D_i. If the bit length of the input data exceeds M, encryption is practiced by using a block cipher mode of operation such as the CBC (Cipher Block Chaining) mode.

The function H is a function that calculates a random value based on an input value without using secret information. The function H is also called "hash function". The function H is a deterministic function which outputs always the same output value for the same input value.

The function H outputs a y-bit random value for finite-bit-length data as an input value. "H(a)=b" signifies outputting a random integer b between 0 and ($2_y$–1) for finite-bit-length data a as an input value. For example, where y=10, the output value b of H(a) is a random integer between 0 and 1023.

A function f is a function that calculates a random value having the same size as the input value based on an input value, with using certain secret information. The function f is also called "pseudo-random replacement". The function f is a deterministic function which outputs always the same output value for the same input value.

The function f outputs an x-bit random value for a k2-bit index key IK and an x-bit integer a, as an input value. "f(IK, a)=b" signifies outputting a random integer b between 0 and $2^x$–1 for a k2-bit index key IK and an x-bit integer a, as an input value. For example, where x=12, the output value b of f(IK, a) is a random integer between 0 and 4095.

The index I is data with an array structure and has a plurality of array elements. The maximum bit length of a value that can be set in one array element of the index I is u.

A value addr that identifies an array element I[addr] of the index I is defined as the address of the index I. This addr is supposed to have a bit length of z.

A storage area is reserved for only an array element to be used among the array elements of the index I. The array element to be used refers to an array element whose value is set. Namely, the index I has an address space of $2_z$ being an exponential size, which is very large. In practice, however, only some addresses are used, and nothing is set in the non-use addresses. Therefore, the substantial data size of the index I is suppressed to a practical polynomial size.

The index name, being the data name of the index I, is expressed as "ID(I)". Note that the index name ID(I) is a mere identifier and does not represent the contents of the index I. Namely, the contents of the index ID(I) cannot be known from the index name ID(I).

The index name ID(I) is supposed to have a bit length of v. If the bit length of the inputted index name is shorter than v, the index name ID(I) is rendered to have v bits by, for example, concatenating several integers 0 to the head of the index name.

"#X" signifies the number of elements of a set X. "Y//Z" signifies join or concatenation of a bit string Y and a bit string Z. Other symbols have the same meanings as those of generally employed mathematic symbols.

Figure 10:
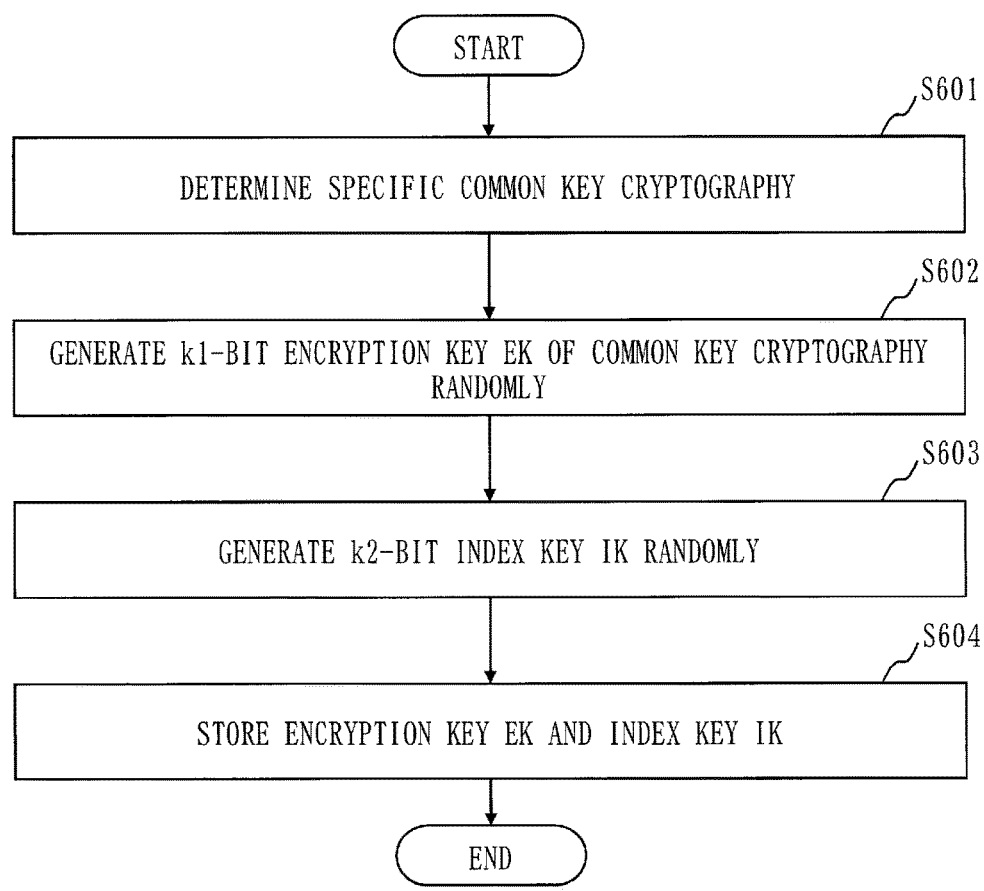
FIG. 10 is a flowchart illustrating a specific example of the initial setting process of the search system according to Embodiment 1.

FIG. 10 is a flowchart illustrating a specific example of the initial setting process of the search system 100.

The flowchart of FIG. 10 corresponds to the flowchart of FIG. 5. S601 corresponds to S101, S602 corresponds to S102, S603 corresponds to S103, and S604 corresponds to S104.

In S601, the secret key generation part 202 determines a specific common key cryptography for encrypting data.

In S602, the secret key generation part 202 randomly generates the k1-bit encryption key EK of the common key cryptography determined in S601.

In S603, the secret key generation part 202 generates the index key IK being a k2-bit random number.

In S604, the secret key management part 203 stores the encryption key EK generated in S602 and the index key IK generated in S603.

Figure 11:
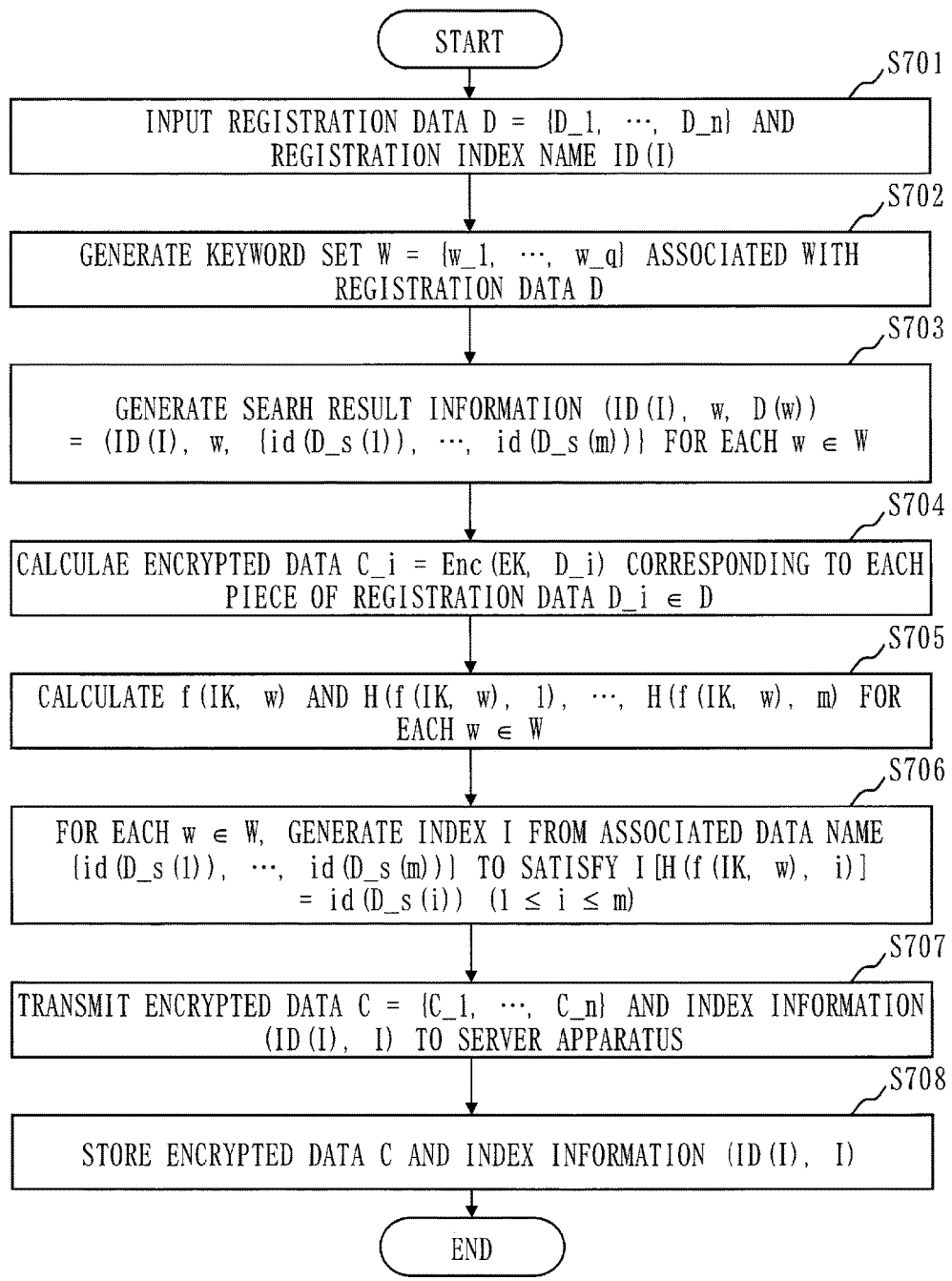
FIG. 11 is a flowchart illustrating a specific example of the data registration process of the search system according to Embodiment 1.

FIG. 11 is a flowchart illustrating a specific example of the data registration process of the search system 100.

The flowchart of FIG. 11 corresponds to the flowchart of FIG. 6. S701 corresponds to S201, S702 corresponds to S202, S703 corresponds to S203, S704 corresponds to S204, S705 and S706 correspond to S205, S707 corresponds to S206, and S708 corresponds to S207.

In S701, the user 200 specifies, in the terminal apparatus 201, registration data D={D_1, . . . , D_n} and registration index name ID(I) with using the keyboard, mouse, or the like. The keyword setting part 204 accepts input of the registration data D and registration index name ID(I).

The registration data D includes at least one piece of plaintext data D_i. The suffix i represents an arbitrary integer of 1 or more. Hereinafter, the number of pieces of data in the registration data D is denoted by n, and a data name id(D_i) of each piece of data D_i is supposed to be a u-bit integer. When registering data additionally, the additional data will be correlated to a different u-bit integer so the data name of the additional data will not be the same as an already registered data name.

The number of pieces of data that can be registered at a time is supposed to be N. N is an integer of 1 or more being a system parameter which is set and publicized in advance. N may be any integer as far as it has a realistic magnitude such as 1000 or 10000. When the number of pieces of data in the registration data D exceeds N, the registration data D may be divided into several groups each having N or less pieces of data, and S701 to S708 may be repeatedly executed for those groups.

In S702, the keyword setting part 204 generates a keyword set W={w_1, . . . , w_q} associated with the registration data D inputted in S701.

The keyword set W includes at least one keyword w. Hereinafter, the number of keywords in the keyword set W is supposed to be q. The keyword w is associated with at least one piece of data D_i of the registration data D.

In S703, the keyword setting part 204 generates search result information (ID(I), w, D(w)) for the registration index name ID(I) inputted in S701 and for each keyword w included in the keyword set W generated in S702. Note that D(w) is a set that includes the data name of data associated with the keyword w and is expressed by {id(D_s(1)), . . . , id(D_s(m))}. The data associated with the keyword w is the data which is hit by the search using the keyword w. Note that m is an integer of 1 or more and that id(D_s(1)), . . . , id(D_s(m)) are u-bit integers that differ from each other.

In S704, the data encryption part 205 reads out the encryption key EK from the secret key management part 203. The data encryption part 205 generates encrypted data C_i=Enc(EK, D_i) (1≤i≤n) by encrypting, with using the encryption key EK, each piece of data D_i in the registration data D inputted in S701.

In S705, the index generation part 206 reads out the index key IK from the secret key management part 203. The index generation part 206 calculates f(IK, w) and H(f(IK, w), 1), . . . , H(f(IK, w), m) for each keyword w generated in S702.

In S706, the index generation part 206 sets the index I such that I[H(f(IK, w), 1)]=id(D_s(1)), . . . , I[H(f(IK, w), m)]=id(D_s(m)) holds for H(f(IK, w), 1), ..., H(f(IK, w), m) D(w)={id(D_s(1)), ..., id(D_s(m))} which correspond to each keyword w and which are generated in S705 and in S703, respectively. Namely, the index generation part 206 sets H(f(IK, w), j) as the address of the index I and sets id(D_s(j)) in the array element of the address. The suffix j is an integer of 1 or more.

In S707, the communication part 210 transmits to the server apparatus 301 the encrypted data C={C_1, ..., C_n} generated in S704, and index information (ID(I), I) being a pair of the index name ID(I) inputted in S701 and the index I generated in S706.

In S708, the communication part 302 receives the encrypted data C and index information (ID(I), I) transmitted in S707. After that, the data storage part 303 stores in the recording medium the encrypted data C. The index storage part 304 stores in the recording medium the index information (ID(I), I).

Figure 12:
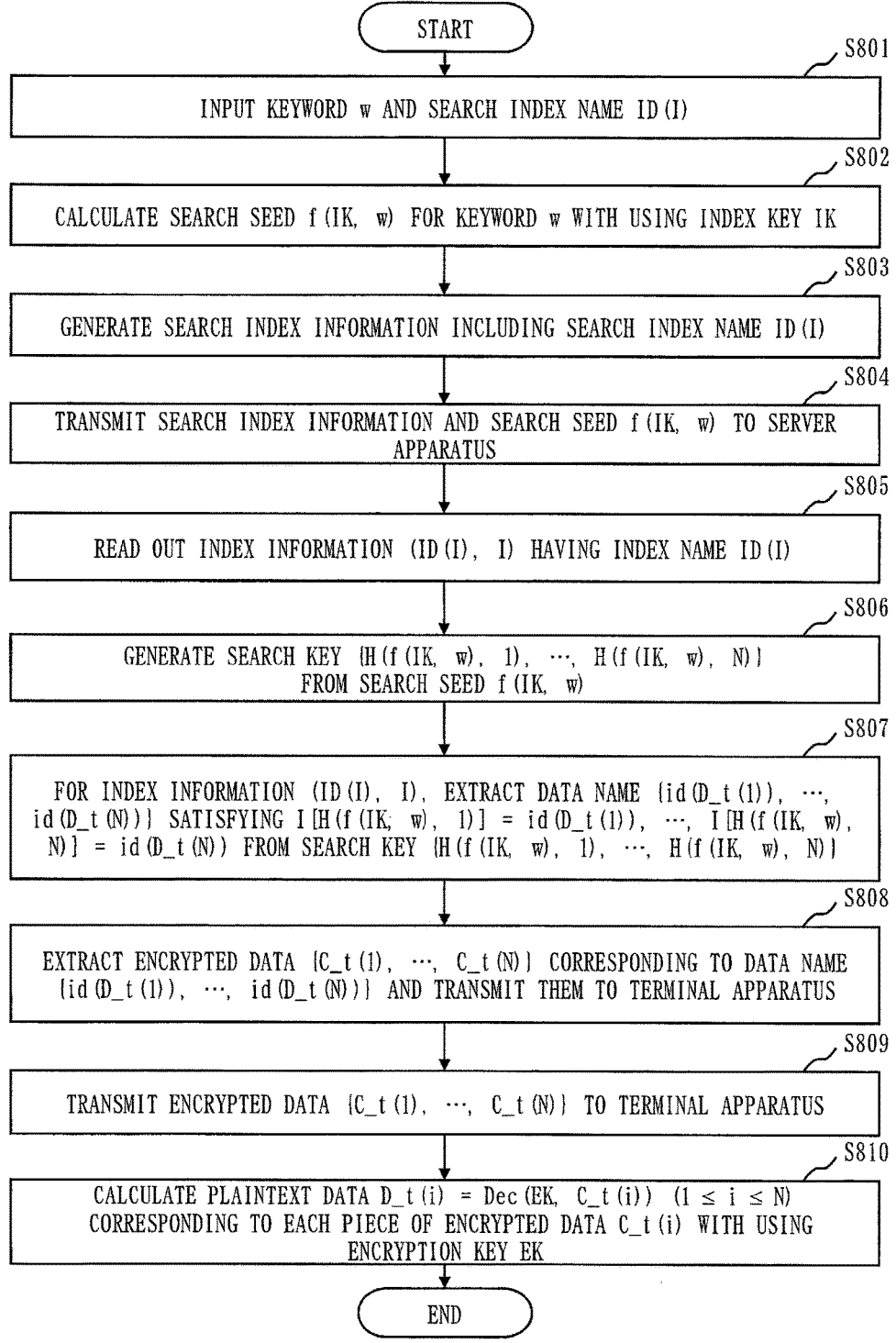
FIG. 12 is a flowchart illustrating a specific example of the data search process of the search system according to Embodiment 1.

FIG. 12 is a flowchart illustrating a specific example of the data search process of the search system 100.

The flowchart of FIG. 12 corresponds to the flowchart of FIG. 7. S801 corresponds to S301, S802 corresponds to S302, S803 corresponds to S303, S804 corresponds to S304, S805 corresponds to S305, S806 corresponds to S306, S807 corresponds to S307, S808 corresponds to S306, S809 corresponds to S309, and S810 corresponds to S310.

In S801, the user 200 specifies in the terminal apparatus 201 the keyword w and the search index name ID(I) with using the keyboard, mouse, or the like. The keyword encryption part 209 accepts input of the keyword w and search index name ID(I). A plurality of keywords w may be inputted. A plurality of search index names ID(I) may be inputted.

In S802, the keyword encryption part 209 reads out the index key IK from the secret key management part 203. The keyword encryption part 209 calculates a search seed f(IK, w) for the keyword w inputted in S801.

In S803, the keyword encryption part 209 generates the search index information that includes the search index name ID(I) inputted in S801. When a plurality of search index names ID(I) are inputted in S801, the keyword encryption part 209 generates search index information that includes all of those index names ID(I).

In S804, the communication part 210 transmits the search seed f(IK, w) generated in S802 and the search index information generated in S803 to the server apparatus 301.

In S805, the communication part 302 receives the search seed f(IK, w) and search index information transmitted in S804. After that, the search part 305 extracts the search index name ID(I) from the search index information transmitted from the communication part 302. The search part 305 reads out the index information (ID(I), I) corresponding to the search index name ID(I) from the index storage part 304. Where there are a plurality of search index names ID(I), the search part 305 reads out index information (ID(I), I) for each index name.

In S806, the search part 305 transmits the search seed f(IK, w) transmitted from the communication part 302, to the search key generation part 306. The search key generation part 306 generates a search key {H(f(IK, w), 1), ..., H(f(IK, w), N)} from the search seed f(IK, w) where N is an integer of 1 or more being the above-described system parameter which is set in advance.

In S807, with using the search key {H(f(IK, w), 1), ..., H(f(IK, w), N)} generated in S806, the search part 305 identifies an address that coincides with {H(f(IK, w), 1), ..., H(f(IK, w), N)} in the index I of the index information (ID(I), I) read out in S805. Since I[H(f(IK, w), 1)]=id(D_t(1)), ..., I[H(f(IK, w), N)]=id(D_t(N)), the search part 305 extracts a plurality of different u-bit data names id(D_t(1)), ..., id(D_t(N)) from the identified address. A set {id(D_t(1)), ..., id(D_t(N))} will be called search result information hereinafter.

Assume that data names id(D_t(1)), ..., id(D_t(j)) stored at addresses coinciding with H(f(IK, w), 1), ..., H(f(IK, w), j) in the index I exist but a data name id(D_t(j+1)) stored at an address coinciding with H(f(IK, w), j+1) does not exist. In this case, according to the index I generation method of S706, it can be seen that data names id(D_t(j+2)), ..., id(D_t(N)) stored at addresses coinciding with H(f(IK, w), j+2), ..., H(f(IK, w), N) do not exist either. Therefore, the search part 305 does not need to practice a process of extracting data names for H(f(IK, w), j+2), ..., H(f(IK, w), N). More specifically, the search part 305 only needs to generate the search result information {id(D_t(1)), ..., id(D_t(N))} by setting null characters in the data names id(D_t(j+1)), ..., id(D_t(N)). That is, the search part 305 only needs to generate the search result information {id(D_t(1)), ..., id(D_t(j))} where id(D_t(1)), ..., id(D_t(j)) are u-bit integers that differ from each other.

If none of data names id(D_t(1)), ..., id(D_t(N)) stored at the addresses coinciding with H(f(IK, w), 1), ..., H(f(IK, w), N) exists, the search part 305 sets the search result information as "none". More specifically, if an address coinciding with all of H(f(IK, w), 1), ..., H(f(IK, w), N) does not exist in the index I, the search part 305 sets the search result information as "none".

In S806, the search part 305 generates all of the search keys H(f(IK, w), 1), ..., H(f(IK, w), N) from the search seed f(IK, w). S806 and S807 may be executed alternately. For example, the search part 305 extracts a data name id(D_t(1)) from the array element I[H(f(IK, w), 1)] of the index I immediately after the search key H(f(IK, w), 1) is generated from the search seed f(IK, w). Then, the search part 305 extracts a data name id(D_t(2)) from the array element I[H(f(IK, w), 2)] of the index I immediately after the search key H(f(IK, w), 2) is generated from the search seed f(IK, w). Thereafter, the search part 305 repeats this process. By using this process procedure, calculation of addresses H(f(IK, w), j+2), ..., H(f(IK, w), N) not existing in the index I can be eliminated.

In S808, the search part 305 reads out encrypted data C_t(1), ..., C_t(N) corresponding to the u-bit data names id(D_t(1)), ..., id(D_t(N)) extracted in S807, from the data storage part 303. If data names id(D_t(j+1)), ..., id(D_t(N)) for a certain integer j consist of null characters, encrypted data C_t(j+1), ..., C_t(N) do not exist, so that processes concerning these pieces of encrypted data are not executed. If the search result information extracted in S807 indicates "none", the process of S808 is not executed itself.

In S809, the communication part 302 receives the encrypted data {C_t(1), ..., C_t(N)} read out in S808, from the search part 305. The communication part 302 transmits the encrypted data {C_t(1), ..., C_t(N)} to the terminal apparatus 201. If the search result information extracted in S807 indicates "none", the communication part 302 transmits information indicating "no encrypted data" to the terminal apparatus 201.

In S810, the communication part 210 receives the encrypted data {C_t(1), ..., C_t(N)} transmitted in S809. After that, the data decryption part 211 decrypts each piece of encrypted data C_t(i) with using the encryption key EK stored in the secret key management part 203, to generate plaintext data D_t(i)=Dec(EK, C_t(i)) ($1 \leq i \leq N$). If the encrypted data {C_t(j+1), . . . , C_t(N)} does not exist, the data decryption part 211 performs no process for such encrypted data. If the communication part 210 receives information indicating "no encrypted data", the data decryption part 211 does nothing. The data decryption part 211 outputs plaintext data {D_t(1), . . . , D_t(N)} obtained by decryption to the display, printer, or the like. If the communication part 210 receives information indicating "no encrypted data", the data decryption part 211 outputs a message or the like indicating that the search hits no data.

Figure 13:
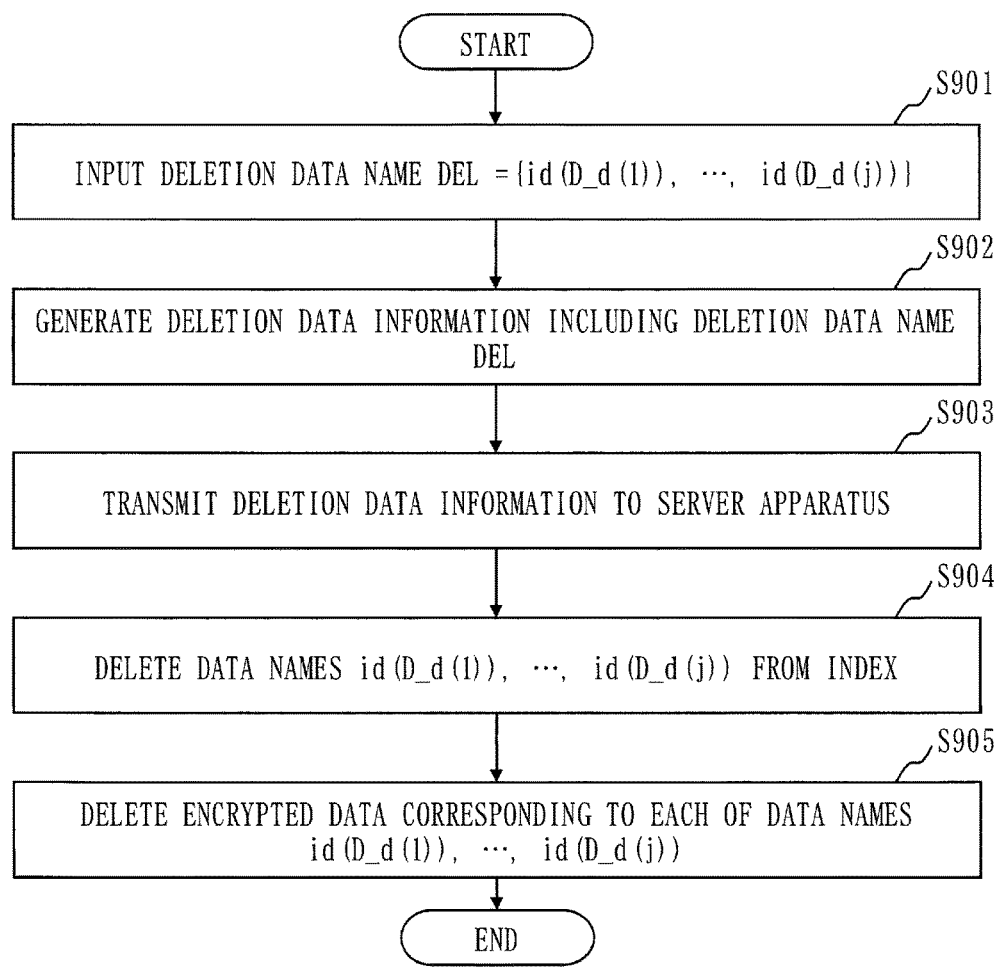
FIG. 13 is a flowchart illustrating a specific example of the data deletion process of the search system according to Embodiment 1.

FIG. 13 is a flowchart illustrating a specific example of the data deletion process of the search system 100.

The flowchart of FIG. 13 corresponds to the flowchart of FIG. 8. S901 corresponds to S401, S902 corresponds to S402, S903 corresponds to S403, S904 corresponds to S404, and S905 corresponds to S405.

In S901, the user 200 specifies a deletion data name DEL={id(D_d(1)), . . . , id(D_d(k))} in the terminal apparatus 201 with using the keyboard, mouse, or the like. The data deletion request generation part 207 accepts input of the deletion data name DEL. Note that k is an integer of 1 or more and that id(D_d(1)), . . . , id(D_d(k)) are u-bit integers that differ from each other.

In S902, the data deletion request generation part 207 generates deletion data information that includes the deletion data name DEL={id(D_d(1)), . . . , id(D_d(k))} inputted in S901.

In S903, the communication part 210 transmits the deletion data information generated in S902 to the server apparatus 301.

In S904, the communication part 302 receives the deletion data information transmitted in S903. The index update part 307 extracts the deletion data name DEL= {id(D_d(1)), . . . , id(D_d(k))} from the deletion data information transmitted from the communication part 302. The index storage part 304 reads out all the indexes I from the recording medium and searches for an index I that includes one of id(D_d(1)), . . . , id(D_d(k)). When such an index I is found, the index storage part 304 deletes the deletion data name from the corresponding address of that index I. In this example, the index storage part 304 deletes the address itself that includes this deletion data name, from the index I.

In S905, the data storage part 303 deletes encrypted data corresponding to the deletion data name DEL= {id(D_d(1)), . . . , id(D_d(k))} sent from the index update part 307, from the recording medium.

Figure 14:
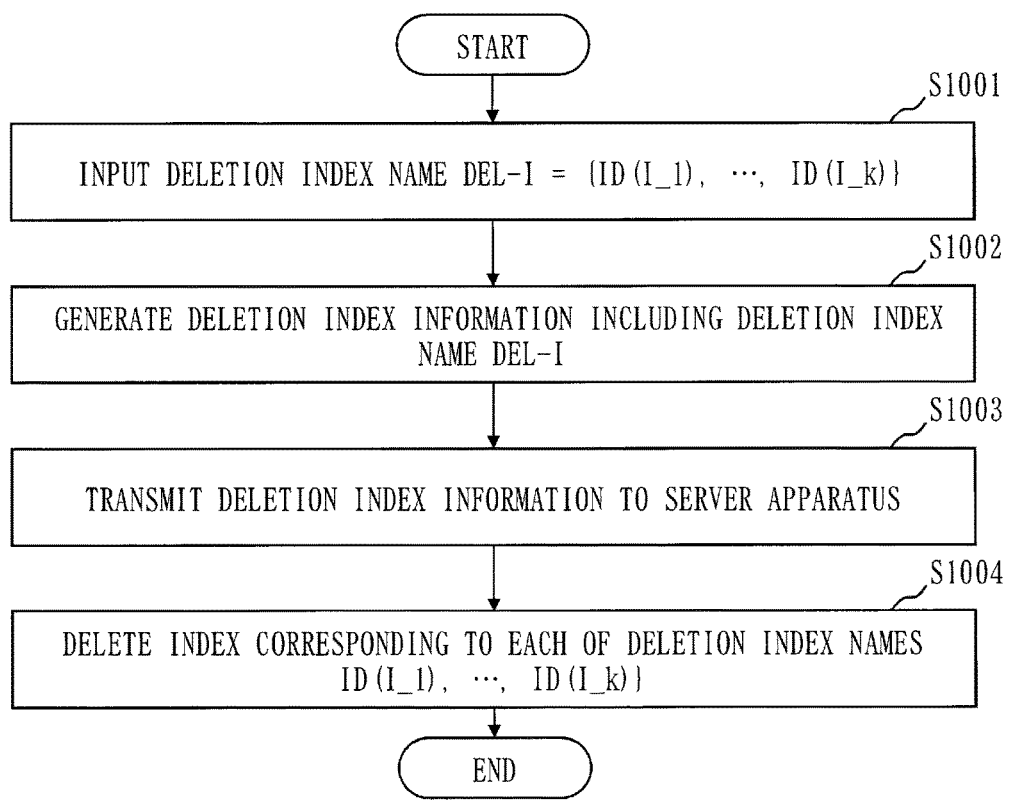
FIG. 14 is a flowchart illustrating a specific example of the index deletion process of the search system according to Embodiment 1.

FIG. 14 is a flowchart illustrating a specific example of the index deletion process of the search system 100.

The flowchart of FIG. 14 corresponds to the flowchart of FIG. 9. S1001 corresponds to S501, S1002 corresponds to S502, S1003 corresponds to S503, and S004 corresponds to S504.

In S001, the user 200 specifies a deletion index name DEL-I={ID(I_1), . . . , ID(I_k)} in the terminal apparatus 201 with using the keyboard, mouse, or the like. The index deletion request generation part 208 accepts input of the deletion index name DEL-I. Note that k is an integer of 1 or more and that ID(I_1), . . . , ID(I_k) are v-bit integers that differ from each other.

In S1002, the index deletion request generation part 208 generates deletion index information that includes the deletion index name DEL-I inputted in S1001.

In S1003, the communication part 210 transmits the deletion index information generated in S1002 to the server apparatus 301.

In S1004, the communication part 302 receives the deletion index information transmitted in S1003. The index update part 307 extracts the deletion index name DEL-I={ID (I_1), . . . , ID(I_k)} from the deletion index information sent from the communication part 302. The index storage part 304 deletes the indexes corresponding to ID(I_1), . . . , ID(I_k) from the recording medium.

Description of Effect

For example, this embodiment provides the following effects.

In this embodiment, the server apparatus 301 being the search executer side performs search with using the function H that outputs a unique numeric value in response to an inputted keyword. The server apparatus 301 stores, as the index, a data structure which has a plurality of storage areas corresponding, in one-to-one relation, to the numeric values outputted from the function H. The server apparatus 301 is capable of performing search if a keyword is inputted to the function H. The terminal apparatus 201 being a search requester side can request search only by transferring the keyword to the server apparatus 301. Therefore, according to this embodiment, the overall processing efficiency of the search requester side and search executer side increases.

In this embodiment, the terminal apparatus 201 generates a search seed by encrypting a keyword, and transfers the search seed to the server apparatus 301 in place of a plaintext keyword. Therefore, according to this embodiment, not only data searched for by the server apparatus 301 but also a keyword can be concealed. Namely, high-security concealed search is possible.

In this embodiment, different from the conventional scheme, it is possible to decrease in the search process the cost of generating information necessary for performing search with the terminal apparatus 201 used by the user 200 being a searcher. More precisely, the generation cost of the search query in the conventional scheme depends on the number of pieces of registration data. In contrast to this, the generation cost of the search seed in the search system 100 does not depend on the number of pieces of registration data. Hence, the search process in the terminal apparatus 201 can be executed efficiently. This embodiment is particularly effective when an appliance such as an IC card whose calculation resources are insufficient is used as the terminal apparatus 201.

In this embodiment, different from the conventional scheme, the data size of information necessary for performing search in the search process does not depend on the number of pieces of registration data. Hence, the data size of information necessary for performing search can be reduced. More precisely, in the conventional scheme, the data size of a search query depends on the number of pieces of registration data. In contrast to this, the data size of the search seed in the search system 100 does not depend on the number of pieces of registration data. Hence, the data size can be reduced. This embodiment is particularly effective when the communication band is narrow.

The search system 100 is capable of performing search with data and keyword both in the encrypted form. Hence, information about the searched-for data nor information about the keyword used for search leaks. As a result, secure search is possible.

Figure 15:
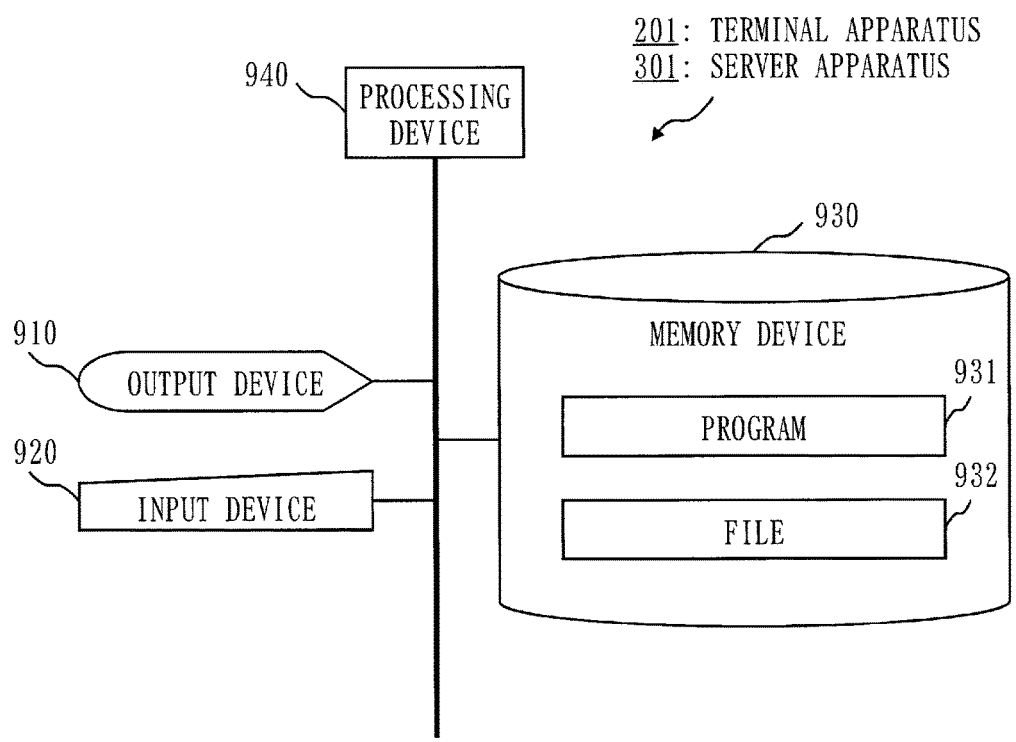
FIG. 15 is a diagram illustrating an example of a hardware configuration of the terminal apparatus and server apparatus according to Embodiment 1.

FIG. 15 is a diagram illustrating an example of a hardware configuration of the terminal apparatus 201 and server apparatus 301 according to this embodiment.

In the example of FIG. 15, each of the terminal apparatus 201 and the server apparatus 301 is a computer and includes hardware such as an output device 910, an input device 920, a memory device 930, and a processing device 940. The hardware is utilized by what is described as "part" in the description of the embodiment of the present invention.

The output device 910 is, for example, a display device such as an LCD (Liquid Crystal Display), a printer, or a communication module. The output device 910 is used by what is described as "part" in the description of the embodiment of the present invention, to serve output or transmission of data, information, and a signal.

The input device 920 is, for example, a keyboard, a mouse, a touch panel, or a communication module. The input device 920 is used by what is described as "part" in the description of the embodiment of the present invention, to serve input or reception of data, information, and a signal.

The memory device 930 is, for example, a ROM (Read Only Memory), a RAM (Random Access Memory), an HDD (Hard Disk Drive), or an SSD (Solid State Drive). A program 931 and a file 932 are stored in the memory device 930. The program 931 includes a program that executes the process of what is described as "part" in the description of the embodiment of the present invention. The file 932 includes data, information, a signal, or the like which is, for example, computed, processed, read, written, used, inputted, and outputted by what is described as "part" in the description of the embodiment of the present invention. The recording medium described above is equivalent to the memory device 930.

The processing device 940 is, for example, a CPU (Central Processing Unit). The processing device 940 is connected to other hardware devices via a bus or the like and controls such hardware devices. The processing device 940 reads out the program 931 from the memory device 930 and executes the program 931. The processing device 940 is used by what is described as "part" in the description of the embodiment of the present invention, for performing computation, processing, read, write, use, input, output, and so on.

What is described as "part" in the description of the embodiment of the present invention may be replaced by "circuit", "device", or "appliance". What is described as "part" in the description of the embodiment of the present invention may be replaced by "step", "procedure", or "process". Namely, what is described as "part" in the description of the embodiment of the present invention is implemented by software alone, hardware alone, or a combination of software and hardware. The software is stored in the memory device 930, as the program 931. The program 931 causes the computer to function as what is described as "part" in the description of the embodiment of the present invention. Alternatively, the program 931 causes the computer to execute a process of what is described as "part" in the description of the embodiment of the present invention.

Having described the embodiment of the present invention, this embodiment may be practiced partly. For example, among what are described each as "part" in the description of the embodiment of the present invention, only one may be employed, or an arbitrary combination of several ones may be employed. Note that the present invention is not limited to this embodiment and various modifications may be made where necessary.

REFERENCE SIGNS LIST

100: search system; 101: in-house LAN; 102: Internet; 200: user; 201: terminal apparatus; 202: secret key generation part; 203: secret key management part; 204: keyword setting part; 205: data encryption part; 206: index generation part; 207: data deletion request generation part; 208: index deletion request generation part; 209: keyword encryption part; 210: communication part; 211: data decryption part; 300: data center; 301: server apparatus; 302: communication part; 303: data storage part; 304: index storage part; 305: search part; 306: search key generation part; 307: index update part; 910: output device; 920: input device; 930: memory device; 931: program; 932: file; 940: processing device

The invention claimed is:

1. A server apparatus comprising:
a processing circuitry, the processing circuitry configured to:
store a plurality of pieces of encrypted data;
store, as a data structure, an index which is for performing search with using a function that outputs a unique numeric value in response to an inputted keyword, wherein the index having a plurality of storage areas corresponding, in one-to-one relation, to numeric values outputted from the function, and storing, for a plurality of keywords corresponding to plaintext data being pre-encryption data of one of the plurality of pieces of encrypted data, an identifier of encrypted data being post-encryption data of the plaintext data to which each keyword corresponds, in a storage area corresponding to a numeric value outputted from the function when said each keyword is inputted;
receive one of the plurality of keywords from a terminal apparatus; and
input the received keyword to the function, identify a storage area corresponding to a numeric value outputted from the function, from the index, and acquire encrypted data corresponding to the identifier stored in the identified storage area,
wherein the received keyword is sufficient information from the terminal apparatus for the server apparatus to acquire the corresponding encrypted data from the identified storage area.

2. The server apparatus according to claim 1, wherein the plurality of pieces of encrypted data are post-encryption data of a plurality of pieces of plaintext data encrypted by the terminal apparatus that keeps an encryption key, with using the encryption key.

3. The server apparatus according to claim 2, wherein the index is a data structure generated by the terminal apparatus.

4. The server apparatus according to claim 2, wherein the function is a function that outputs the unique numeric value in response to a keyword encrypted by the terminal apparatus that keeps an index key, with using the index key.

5. The server apparatus according to claim 4, wherein the processing circuitry receives the keyword encrypted by the terminal apparatus with using the index key, from the terminal apparatus.

6. The server apparatus according to claim 5, wherein the processing circuitry transmits the acquired encrypted data to the terminal apparatus.

7. The server apparatus according to claim 2, wherein the processing circuitry, when an identifier of encrypted data to be deleted is specified by the terminal apparatus, deletes the encrypted data corresponding to the specified identifier, identifies a storage area where the specified identifier is stored, from the index, and deletes contents of the identified storage area.

8. The server apparatus according to claim 1,
wherein the function is a function that outputs the unique numeric value in response to a combination of the inputted keyword and an inputted numeric value;

wherein the index is a data structure which stores, for two or more pieces of plaintext data to which a common keyword corresponds, an identifier of encrypted data being post-encryption data of each piece of plaintext data, in a storage area corresponding to a numeric value outputted from the function when the common keyword and a numeric value which is for identifying said each piece of plaintext data are inputted; and wherein the processing circuitry inputs a numeric value falling within a preset range, one by one to the function together with one of the plurality of keywords, and if a storage area corresponding to a numeric value outputted from the function exists in the index, acquires encrypted data corresponding to the identifier stored in the identified storage area.

9. A terminal apparatus comprising:

a processing circuitry, the processing circuitry configured to:
  generate a plurality of pieces of encrypted data by encrypting a plurality of pieces of plaintext data with using an encryption key;
  generate, as a data structure, an index which is for performing search with using a function that outputs a unique numeric value in response to an inputted keyword, wherein the index having a plurality of storage areas corresponding, in one-to-one relation, to numeric values outputted from the function, and storing, for a plurality of keywords corresponding to one of the plurality of pieces of plaintext data, an identifier of encrypted data being post-encryption data of the plurality of pieces of plaintext data to which each keyword corresponds, in a storage area corresponding to a numeric value outputted from the function when said each keyword is inputted; and
  transmit the plurality of pieces of encrypted data generated and the generated index to a server apparatus;
  wherein the processing circuitry transmitting one of the plurality of keywords to the server apparatus, and receiving, from the server apparatus, encrypted data which the server apparatus has acquired by inputting the transmitted keyword to the function and searching the index based on a numeric value outputted from the function, and
  wherein the inputted keyword is sufficient information from the terminal apparatus for the server apparatus to acquire the corresponding encrypted data.

10. The terminal apparatus according to claim 9, wherein the processing circuitry encrypts, for the plurality of keywords, said each keyword with using an index key, inputs the encrypted keyword to the function, and generates the index which stores an identifier of the encrypted data being post-encryption data of plaintext data to which the encrypted keyword corresponds, in a storage area corresponding to a numeric value outputted from the function.

11. The terminal apparatus according to claim 10, wherein the processing circuitry encrypts a keyword with using the index key, and transmits the encrypted keyword to the server apparatus.

12. The terminal apparatus according to claim 9, wherein the processing circuitry decrypts the received encrypted data with using a decryption key that corresponds to the encryption key.

13. The terminal apparatus according to claim 9,
  wherein the function is a function that outputs the unique numeric value in response to a combination of the inputted keyword and an inputted numeric value, and wherein the processing circuitry inputs, for two or more pieces of plaintext data to which a common keyword corresponds, the common keyword and a numeric value which is for identifying each piece of plaintext data, to the function, and generates the index which stores an identifier of encrypted data being post-encryption data of said each piece of plaintext data, in a storage area corresponding to a numeric value outputted from the function.

14. A search method comprising:

storing, in a data storage part, a plurality of pieces of encrypted data; and storing, in an index storage part, as a data structure, an index which is for performing search with using a function that outputs a unique numeric value in response to an inputted keyword, wherein the index having a plurality of storage areas corresponding, in one-to-one relation, to numeric values outputted from the function, and storing, for a plurality of keywords corresponding to plaintext data being pre-encryption data of one of the plurality of pieces of encrypted data, an identifier of encrypted data being post-encryption data of the plaintext data to which each keyword corresponds, in a storage area corresponding to a numeric value outputted from the function when said each keyword is inputted;

receiving one of the plurality of keywords from a terminal apparatus; and inputting the received keyword to the function, identifying a storage area corresponding to a numeric value outputted from the function, from the index, and acquiring encrypted data corresponding to the identifier stored in the identified storage area, from the data storage part, wherein the received keyword is sufficient information from the terminal apparatus for the method to acquire the corresponding encrypted data from the identified storage area.

15. A non-transitory computer readable medium storing a server program that causes a computer which includes:

a data storage part to store a plurality of pieces of encrypted data; and an index storage part to store, as a data structure, an index which is for performing search with using a function that outputs a unique numeric value in response to an inputted keyword, wherein the index having a plurality of storage areas corresponding, in one-to-one relation, to numeric values outputted from the function, and storing, for a plurality of keywords corresponding to plaintext data being pre-encryption data of one of the plurality of pieces of encrypted data, an identifier of encrypted data being post-encryption data of the plaintext data to which each keyword corresponds, in a storage area corresponding to a numeric value outputted from the function when said each keyword is inputted;

to execute:
  a communication process of receiving one of the plurality of keywords from a terminal apparatus; and
  a search process of inputting the keyword received by the communication process to the function, identifying a storage area corresponding to a numeric value outputted from the function, from the index, and acquiring encrypted data corresponding to the identifier stored in the identified storage area, from the data storage part, wherein the received keyword is sufficient information from the terminal apparatus for the search process to acquire the corresponding encrypted data from the identified storage area.

16. A non-transitory computer readable medium storing a terminal program that causes a computer to execute:
- a data encryption process of generating a plurality of pieces of encrypted data by encrypting a plurality of pieces of plaintext data with using an encryption key;
- an index generation process of generating, as a data structure, an index which is for performing search with using a function that outputs a unique numeric value in response to an inputted keyword, wherein the index having a plurality of storage areas corresponding, in one-to-one relation, to numeric values outputted from the function, and storing, for a plurality of keywords corresponding to one of the plurality of pieces of plaintext data, an identifier of encrypted data being post-encryption data of the plaintext data to which each keyword corresponds, in a storage area corresponding to a numeric value outputted from the function when said each keyword is inputted; and
- a communication process of transmitting the plurality of pieces of encrypted data generated by the data encryption process and the index generated by the index generation process to a server apparatus;

wherein the communication process transmitting one of the plurality of keywords to the server apparatus, and receiving, from the server apparatus, encrypted data which the server apparatus has acquired by inputting the transmitted keyword to the function and searching the index based on a numeric value outputted from the function, and wherein the inputted keyword is sufficient information from the terminal apparatus for the server apparatus to acquire the corresponding encrypted data.

* * * * *